(12) United States Patent
Sawai et al.

(10) Patent No.: US 8,391,794 B2
(45) Date of Patent: Mar. 5, 2013

(54) COMMUNICATION CONTROL METHOD, COMMUNICATION DEVICE, AND PROGRAM

(75) Inventors: Ryo Sawai, Tokyo (JP); Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 12/849,210

(22) Filed: Aug. 3, 2010

(65) Prior Publication Data
US 2011/0039495 A1 Feb. 17, 2011

(30) Foreign Application Priority Data

Aug. 12, 2009 (JP) .................. 2009-187372
May 12, 2010 (JP) .................. 2010-110015

(51) Int. Cl.
*H04B 17/00* (2006.01)

(52) U.S. Cl. ....... 455/62; 455/552.1; 455/464; 455/509; 455/522

(58) Field of Classification Search ............... 455/62, 455/509, 69, 522, 501, 63.1, 135, 114.2, 455/13.4, 9, 450, 436, 414, 518, 519, 552.1, 455/561, 558, 416; 370/329, 241, 328, 352, 370/311
See application file for complete search history.

(56) References Cited

U.S. PATENT DOCUMENTS

| | | | | |
|---|---|---|---|---|
| 6,151,501 A | * | 11/2000 | Belkin et al. | 455/436 |
| 2008/0176595 A1 | * | 7/2008 | Karaoguz | 455/552.1 |
| 2009/0186608 A1 | * | 7/2009 | Lee et al. | 455/416 |
| 2010/0009716 A1 | * | 1/2010 | Lee et al. | 455/558 |
| 2010/0067419 A1 | * | 3/2010 | Liu et al. | 370/311 |

OTHER PUBLICATIONS

Ahuja, Ramandeep et al., "Cognitive Radio System Using IEEE 802.11a Over UHF TVWS", Motorola, Inc., 2008 IEEE.
Gurney, David et al., "Geo-location Database Techniques for Incumbent Protection in the TV White Space", 2008, Motorola, Inc.
Fujii, Hiromasa et al., "Performance Analysis of Adaptive TPC Spectrum Sharing Under Multicell Environments", May 2008.
Inage, Kei et al., "Spectrum Sharing Based on Capacity Conservation Ratio and Primary User", IEICE Technical Report SR2009-3(May 2009), pp. 13-20.

* cited by examiner

*Primary Examiner* — Tan Trinh
(74) *Attorney, Agent, or Firm* — Wolf, Greenfield & Sacks, P.C.

(57) ABSTRACT

There is provided a method of controlling communication of a second communication service making secondary usage of a spectrum assigned to a first communication service, with use of a communication device, including the steps of: receiving a radio signal transmitted for the first communication service in a first period on a time axis; determining a parameter value to be used for controlling communication of the second communication service based on the radio signal received in the first period; sensing a radio signal transmitted for the second communication service in a second period subsequent to the first period; and transmitting a beacon for the second communication service based on the parameter value in a third period subsequent to the second period when a radio signal for the second communication service is not detected in the second period.

13 Claims, 29 Drawing Sheets

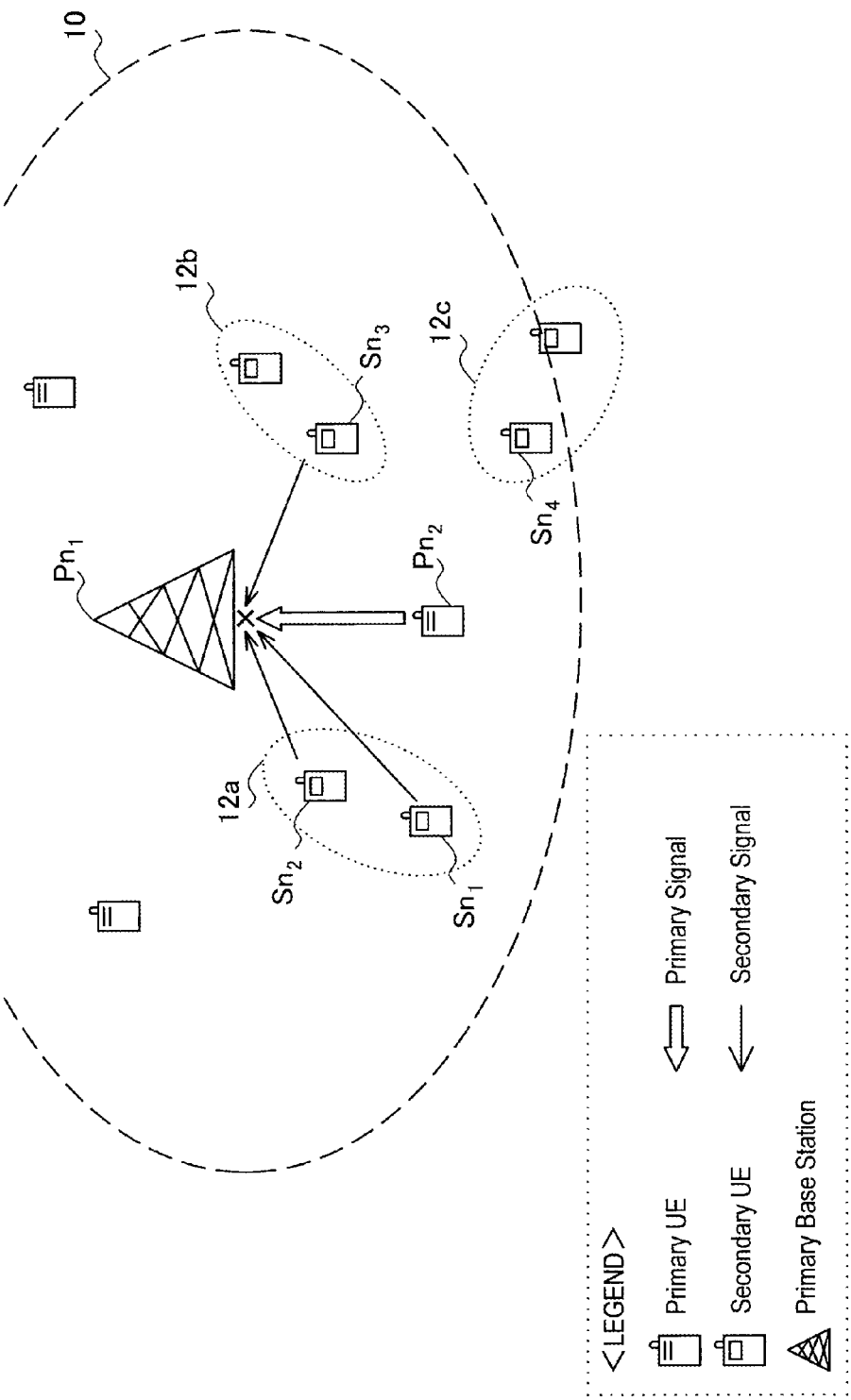

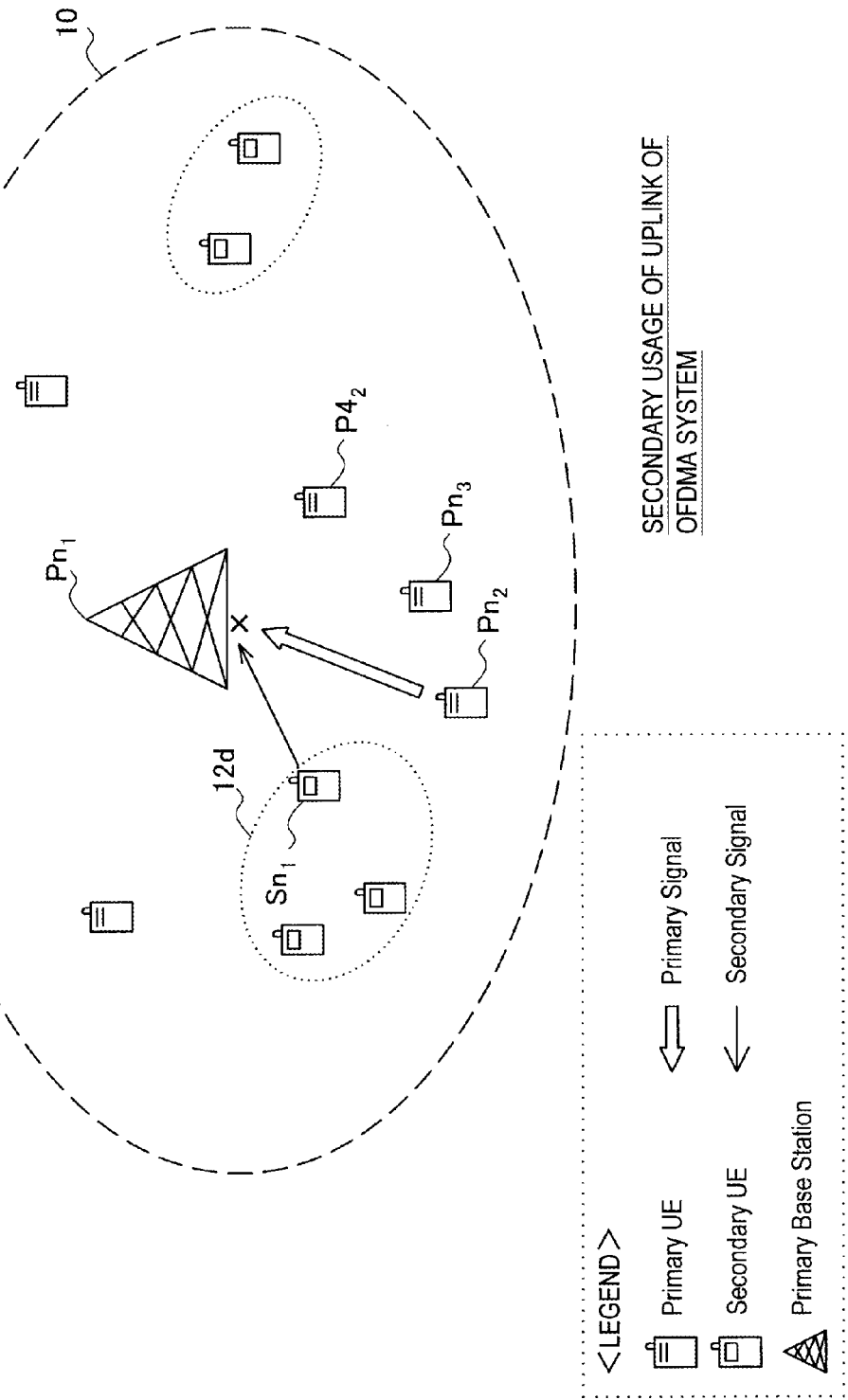

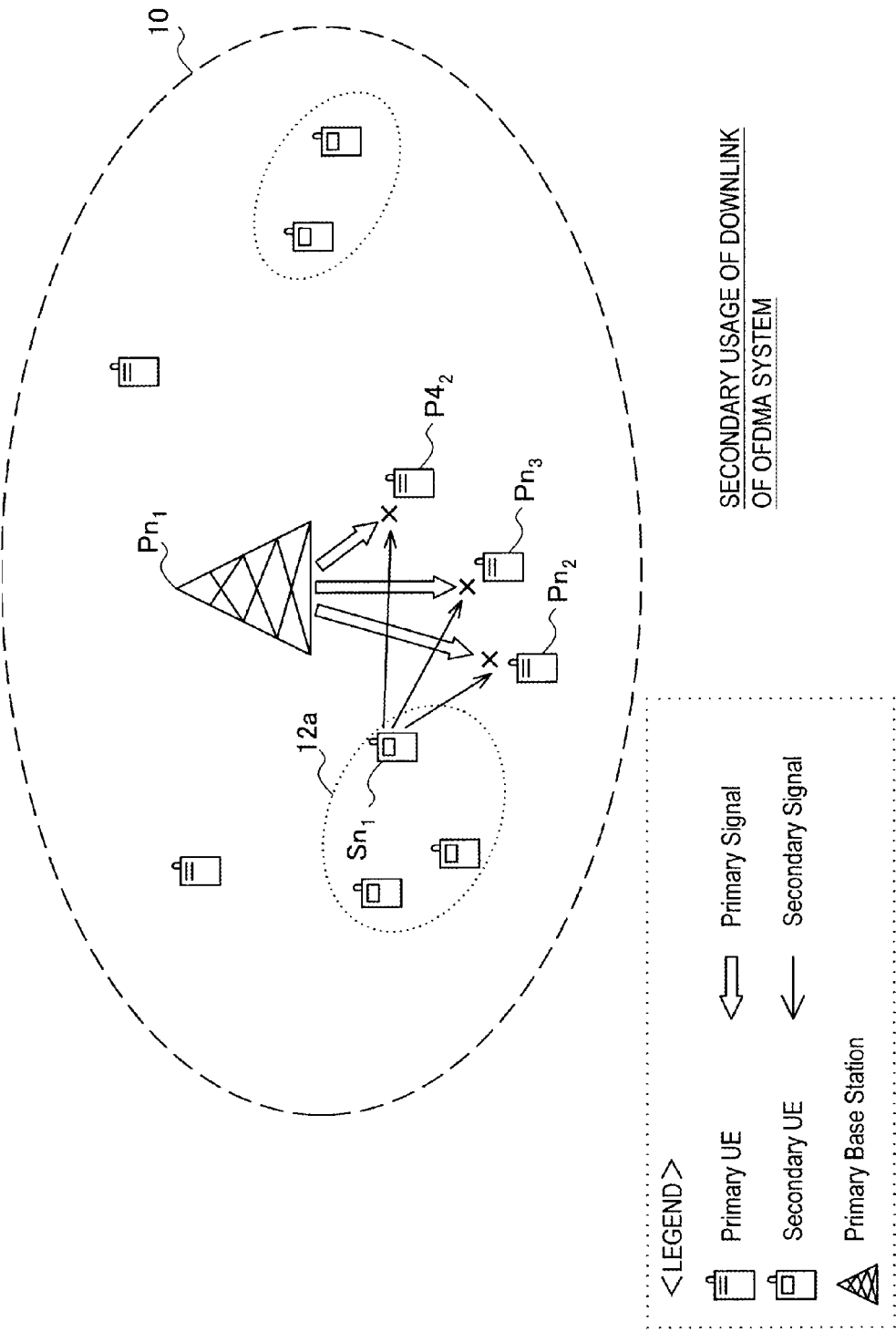

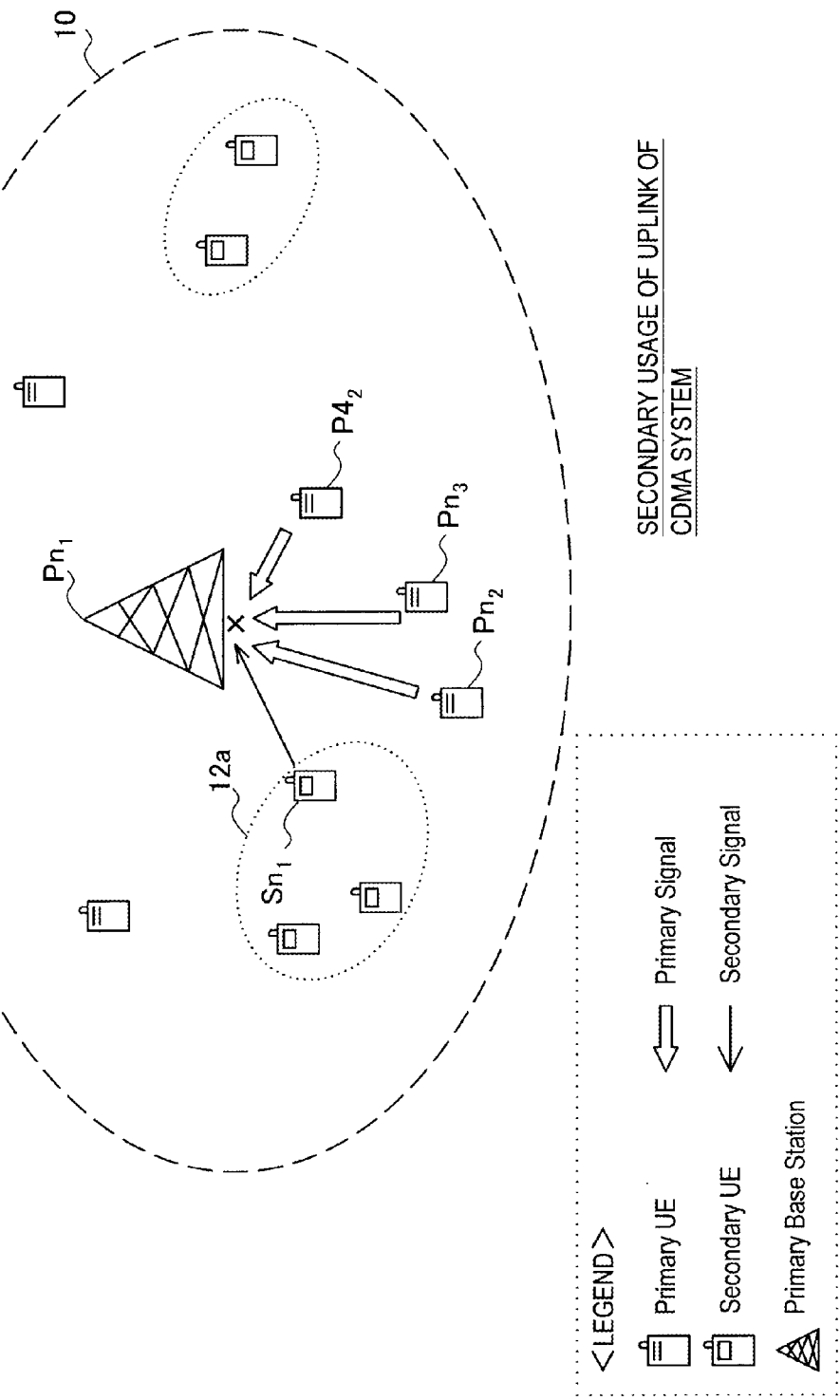

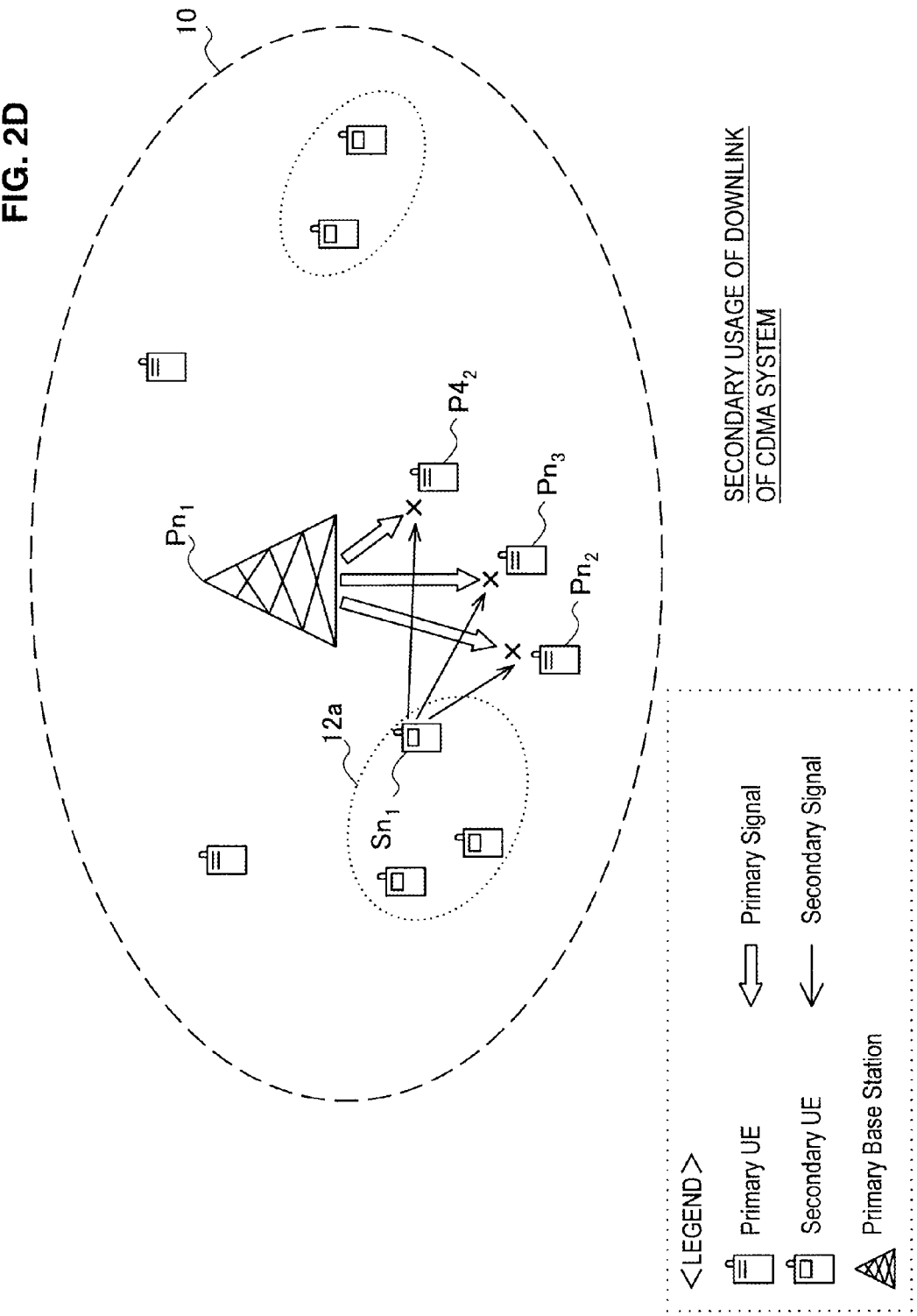

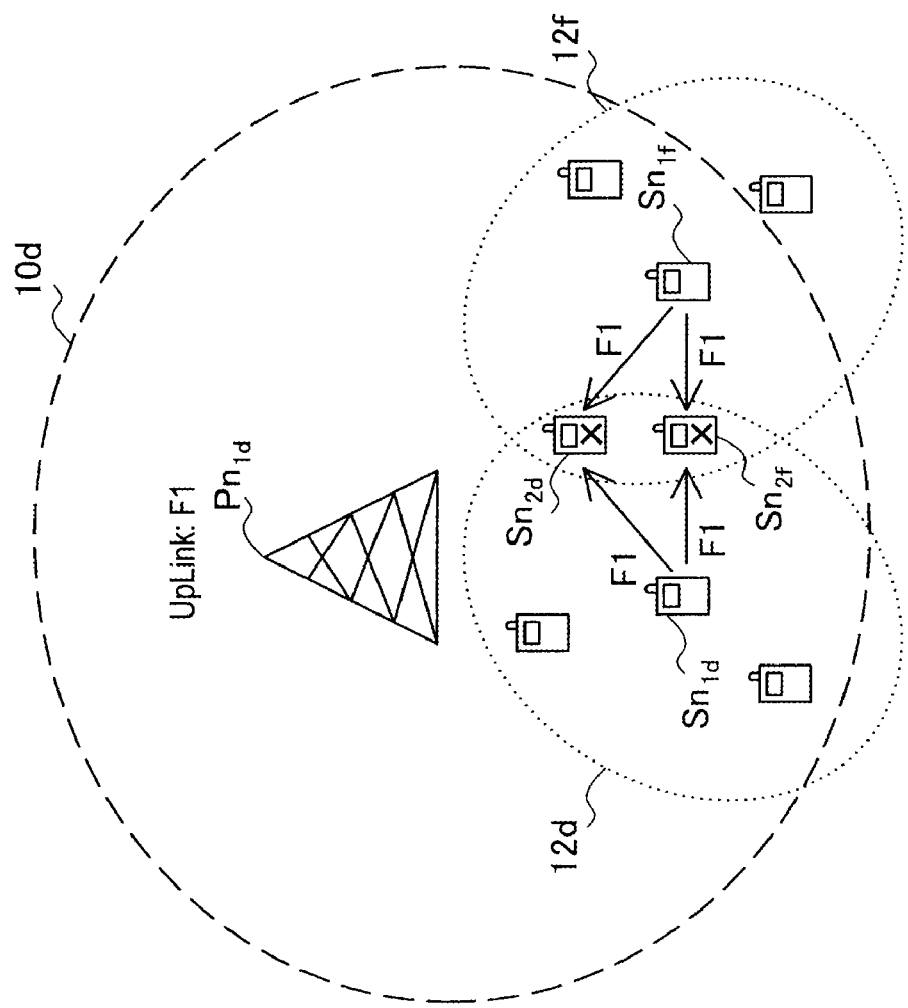

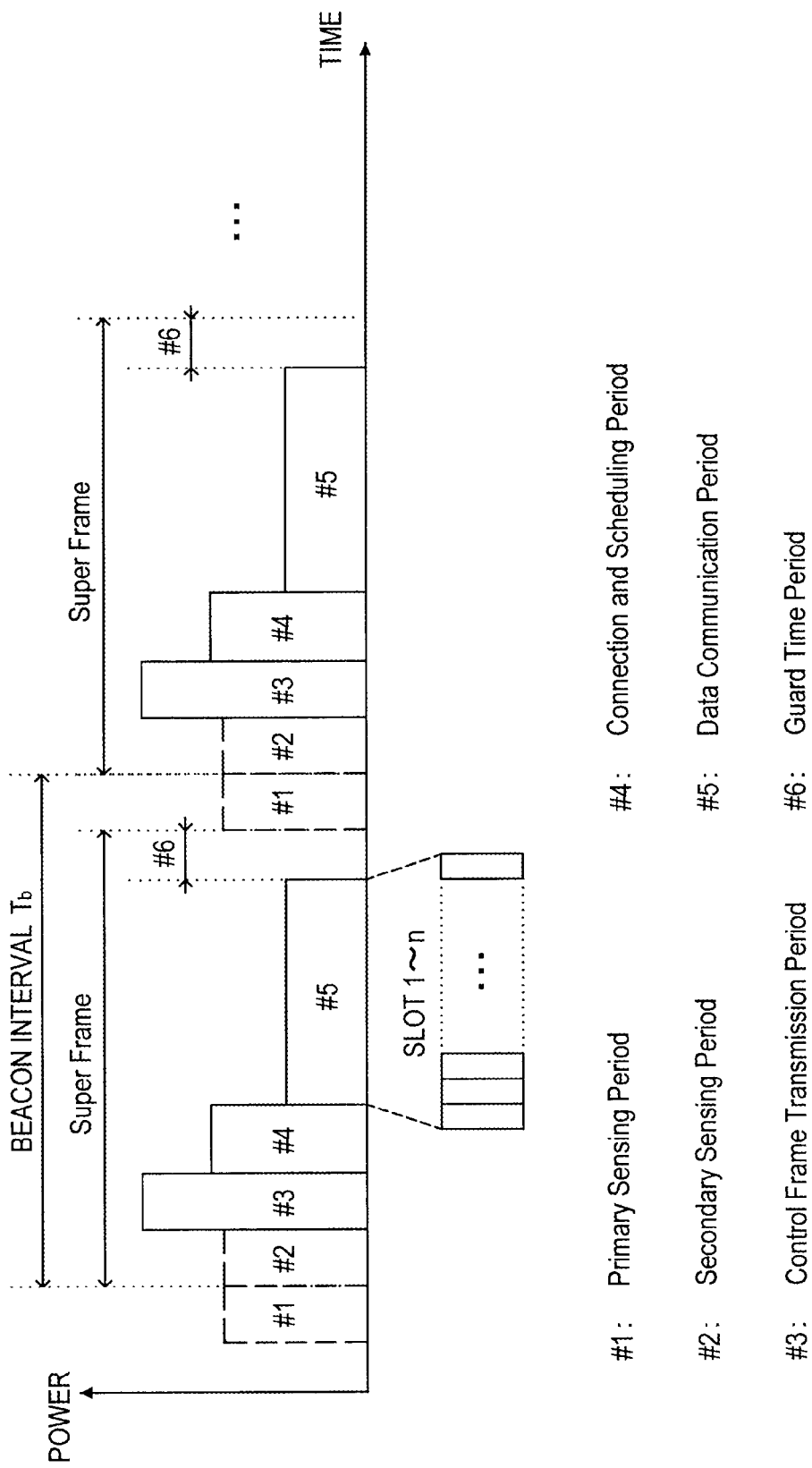

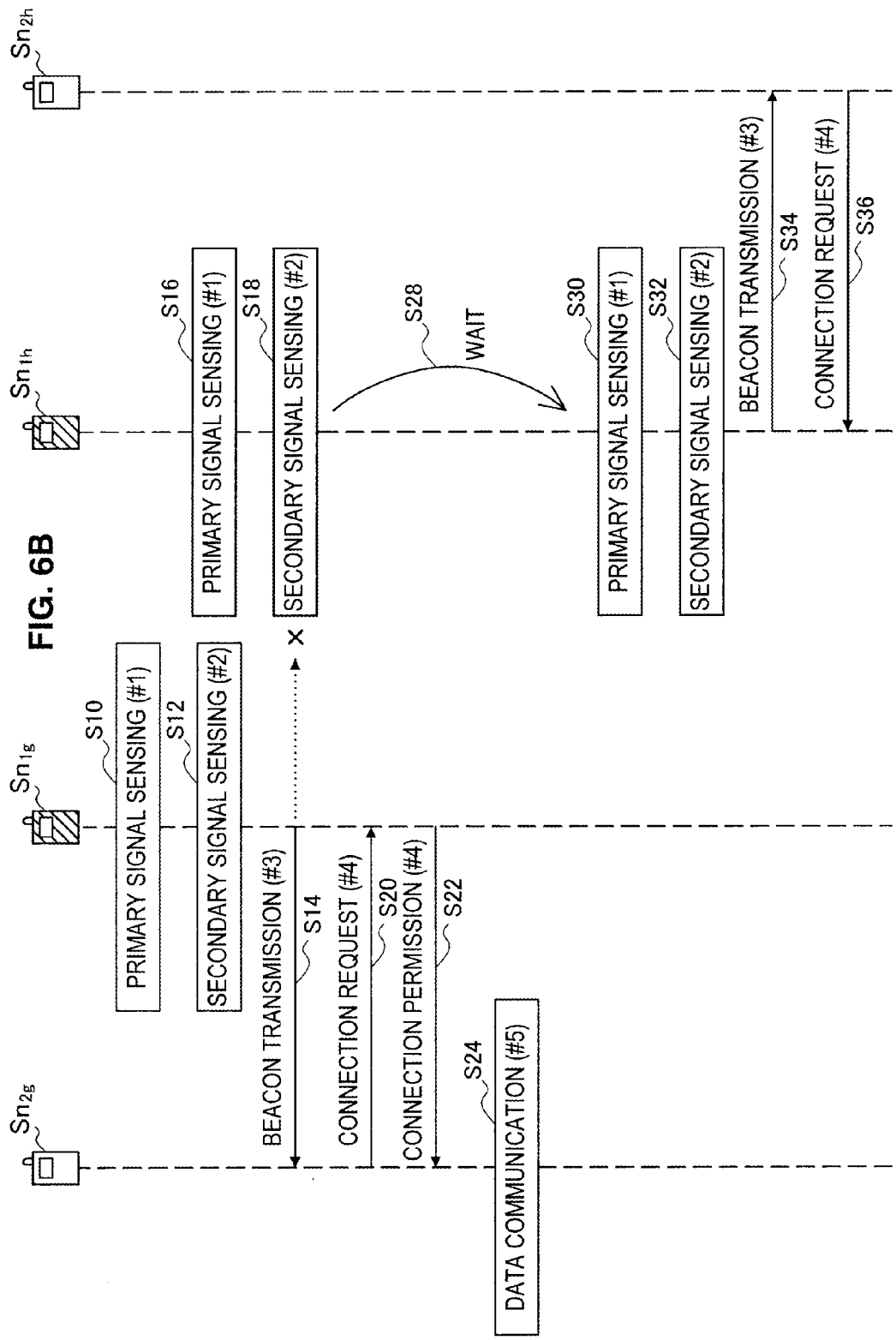

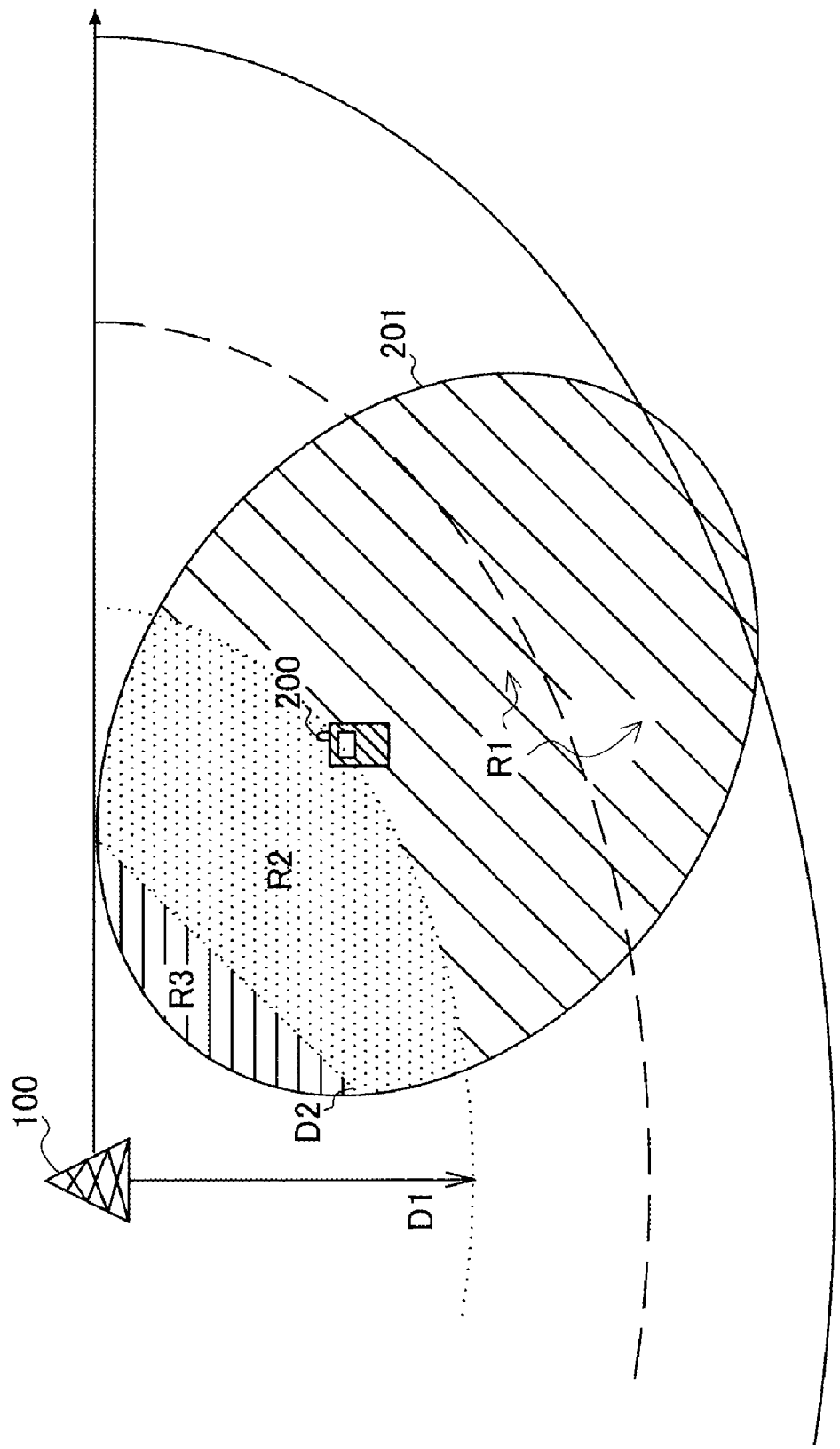

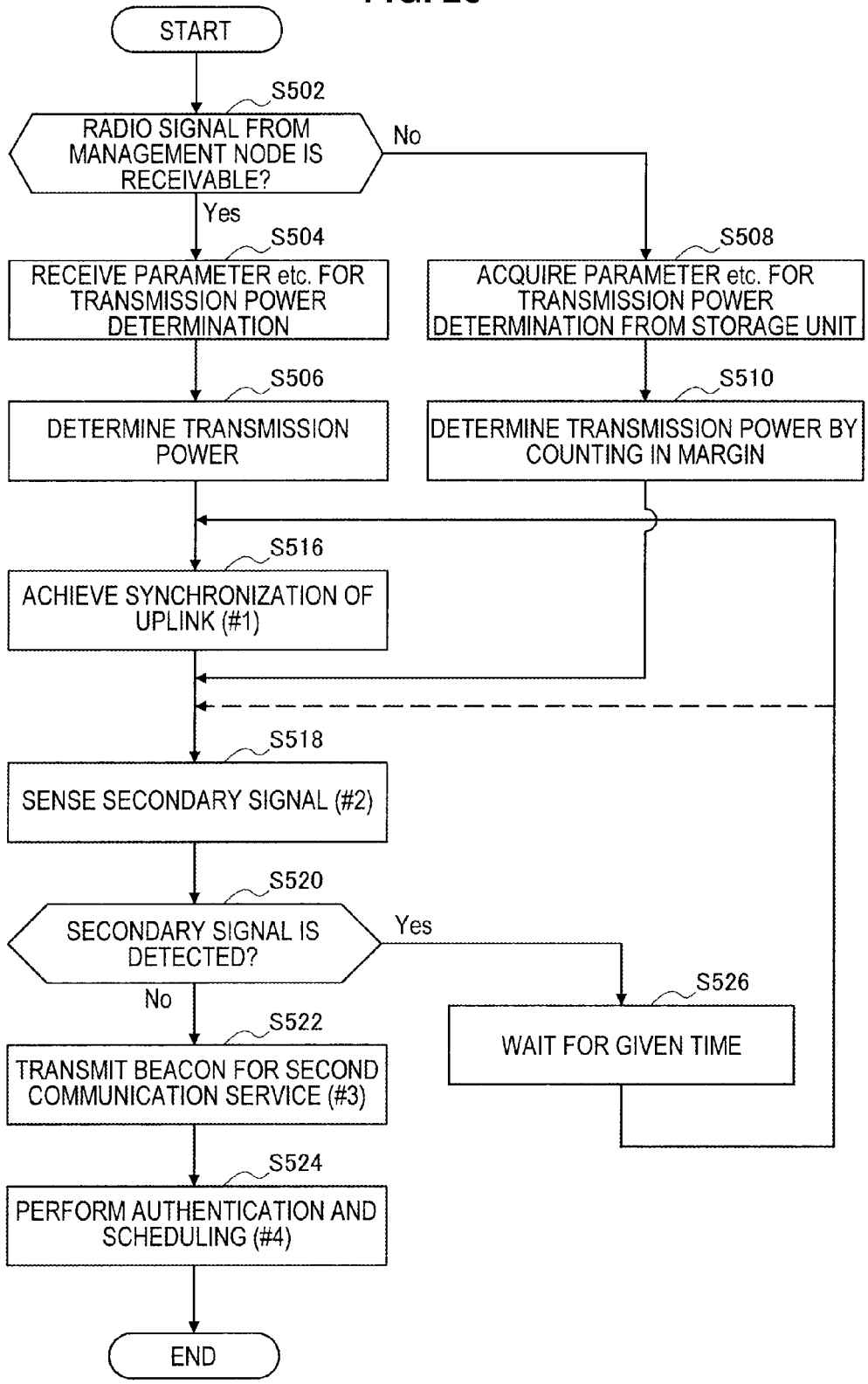

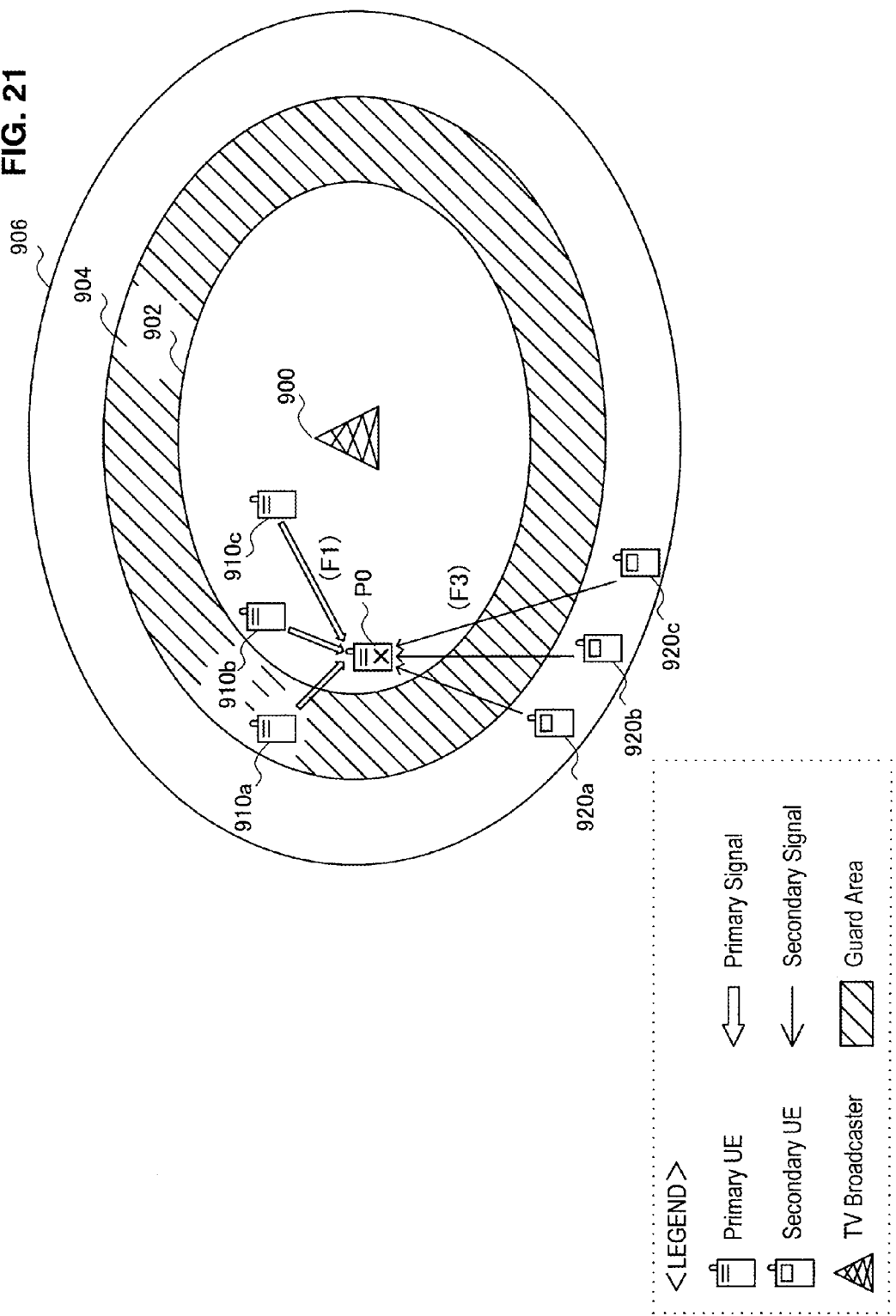

COMMUNICATION CONTROL METHOD, COMMUNICATION DEVICE, AND PROGRAM

CROSS REFERENCE TO RELATED APPLICATIONS

This application claims priority under 35 U.S.C. §119 to Japanese Priority Patent Application JP 2009-187372 filed in the Japan Patent Office on Aug. 12, 2009, the entire contents of which are hereby incorporated by reference, and Japanese Priority Patent Application JP 2010-110015 filed in the Japan Patent Office on May 12, 2010, the entire contents of which are hereby incorporated by reference.

BACKGROUND OF THE INVENTION

1. Field of the Invention

The present invention relates to a communication control method, a communication device, and a program.

2. Description of the Related Art

Discussions have been taking place recently regarding secondary usage of a spectrum assigned for primary usage to provide a secondary communication service depending on the use condition of the spectrum. For example, the standard specification for allowing an unused channel contained in a spectrum of the U.S. digital TV broadcast (TV white spaces) to be available for radio communication has been studied in the IEEE802.22 working group (cf. "IEEE802.22 WG on WRANs", [online], [Searched on Jan. 5, 2009], Internet <URL:http://www.ieee802.org/22/>).

Further, according to the report from FCC (Federal Communications Commission) on November 2008, the discussions are directed toward permitting secondary usage of TV white spaces by using a communication device that fulfills a certain condition and has received an authorization. The FCC's report accepts the above-described standard specification of IEEE802.22 which is the pioneering work on the standardization of secondary usage of TV white spaces and further coverts the moves of a new study group in IEEE. Technically, because it is required to perform signal detection at the level of −114[dBm] (SNR is about −19[dB] when NF (Noise Figure) is 11[dB], for example) with use of existing technology, for example, an auxiliary function such as geo-location database access is expected to be necessary (cf. "SECOND REPORT AND ORDER AND MEMORANDUM OPINION AND ORDER", [online], [Searched on Jul. 10, 2009], Internet <URL:http://hraunfoss.fcc.gov/edocs_public/attachmatch/FCC-08-260A1.pdf>). Further, the FCC is searching for opening a 250 MHz band, which is a part of a 5 GHz band, as a new channel for secondary usage.

Furthermore, in the EU, there are moves afoot to universally allocate a dedicated control channel called CPC (Cognitive Pilot Channel) for making DSA (Dynamic Spectrum Access) under a long-term strategy. Allocation of CPC is incorporated in the agenda of ITU (International Telecommunication Union)-WP11 in 2011. Technological studies for a secondary usage system that makes DSA are also being progressed in IEEE SCC (Standards Coordinating Committee) 41.

In such a background, several research reports have been released recently concerning secondary usage of a spectrum in the case of assuming a broadcasting system, a satellite communication system, a mobile communication system or the like as a primary system. For example, Alan Bok et al., "Cognitive Radio System using IEEE802.11a over UHF TVWS", Motorola, October 2008 proposes a system architecture in the case of operating a radio system with use of the IEEE802.22 standard on TV white spaces of UHF (Ultra High Frequency). Further, D. Gueny et al., "Geo-location database technique for incumbent protection in the TV White space", DySPAN, October 2008 also intends use of TV white spaces and proposes a form that utilizes positional information of a service area of a primary system as external information.

On the occasion of secondary usage of a spectrum, it is generally necessary for a system on the part of secondary usage (secondary system) to carry out the operation that does not degrade the communication quality of a primary system. Therefore, when transmitting a radio signal in the secondary system, it is desirable to control its transmission power so as to avoid interference on a node of the primary system.

Regarding such control of a transmission power, in the case of secondary usage of TV white spaces as proposed by Alan Bok et al. or D. Gueny et al., it can be confirmed beforehand that a channel for secondary usage is not used at all, and it is thus possible to determine in many cases that a transmission power at the maximum level can be used. On the other hand, H. Fujii and H. Yoshino (NTT docomo), "Spectrum sharing by adaptive transmit power control for low priority system and its achievable capacity", CrownCom, May 2008 proposes a technique that protects a node of a high-priority system by adaptively controlling a transmission power in a low-priority system.

Further, Inage et al., "Spectrum Sharing Based on Capacity Conservation Ratio of Primary User", IEICE Technical Report SR2009, May 2009 proposes a technique that, when a system such as a mobile communication system in which the receiving environment of a terminal varies depending on location due to fading or the like is the primary system, adopts the ratio of capacity (capacity conservation ratio) between before and after secondary usage in the primary system as a protection criterion and makes transmission power control for satisfying the capacity conservation ratio.

SUMMARY OF THE INVENTION

In order to make full effective use of a limited spectrum, it is not sufficient to achieve secondary usage of the above-described white space, which is a spectrum in an area where a communication service related to primary usage (which is referred to hereinafter as a first communication service) is not provided. One reason is that secondary usage of the white space is utilization of a spectrum that is apparently available in the long and medium terms in a particular region, and an actual opportunity of usage is limited to an area where there are only a small number of users of the first communication service. Further, as for secondary usage of the TV white space in the United States, for example, it is predicted that part of the spectrum is auctioned and a spectrum left for secondary usage is small.

Given such a situation, one possible approach is to make secondary usage of a spectrum within a service area of the first communication service under permission of a coordinator (e.g. a base station) of the first communication service, for example. Another possible approach is to make secondary usage of a spectrum that is unavailable for the first communication service in an area inside or in the peripheral part of a service area of the first communication service where signal receiving conditions are relatively unsuitable due to shadowing (shielding), fading or the like. In such cases of secondary usage, it is expected that a node of the primary system (which is referred to hereinafter as a primary usage node) and a node of the secondary system (which is referred to hereinafter as a secondary usage node) are located closer to each other. In this case, the possibility increases that a radio signal (secondary signal) of the second communication service which is transmitted from the secondary usage node collides with a radio signal (primary signal) of the first communication service which is received by the primary usage node or interferes with the primary signal. Therefore, it is effective to provide a framework for secondary usage of a spectrum which avoids collision of signals depending on the surrounding communication conditions and suppresses interference on the occasion of secondary usage of a spectrum.

For example, because the technique taught by Inage et al. reduces the entire capacity of the primary system in one cell at a constant rate and allocates the reduced amount of capacity to the secondary system, there remains a possibility that it becomes difficult to receive the primary signal locally in one primary usage node due to interference of the secondary usage node in the nearby vicinity.

In light of the foregoing, it is desirable to provide a novel and improved communication control method, communication device and program that can provide an effective framework for avoiding signal collision and suppressing interference on the occasion of secondary usage of a spectrum.

According to an embodiment of the present invention, there is provided a method of controlling communication of a second communication service making secondary usage of a spectrum assigned to a first communication service, with use of a communication device, including the steps of: receiving a radio signal transmitted for the first communication service in a first period on a time axis; determining a parameter value to be used for controlling communication of the second communication service based on the radio signal received in the first period; sensing a radio signal transmitted for the second communication service in a second period subsequent to the first period; and transmitting a beacon for the second communication service based on the parameter value in a third period subsequent to the second period when a radio signal for the second communication service is not detected in the second period.

The communication device may correspond to a SSC (Secondary Spectrum Coordinator), which is described later, for example. In this configuration, on the occasion of secondary usage of a spectrum, the SSC receives a primary signal transmitted for the first communication service in the first period, for example. Then, based on the primary signal received in the primary sensing period, the SSC determines a parameter value to be used for controlling communication of the second communication service. The determined parameter value may be a transmission power, a frequency, the order of modulation or the like to be used for transmission of a secondary signal, for example. Then, the SSC performs sensing of a secondary signal in the second period. When a secondary signal is not detected in the second period, the SSC transmits a beacon for the second communication service based on the above-described parameter value in the third period.

The step of determining a parameter value may include determining a transmission power of the beacon transmitted in the third period based on the radio signal received in the first period.

The method may further include the step of: receiving a connection request to the second communication service from a secondary usage node having received the beacon in a fourth period subsequent to the third period.

A transmission power of the connection request transmitted from the secondary usage node in the fourth period may be determined based on data included in the beacon transmitted from the communication device in the third period.

The method may further include the step of: assigning a slot included in a fifth period subsequent to the fourth period to each secondary usage node being a transmission source of the connection request received in the fourth period for data transmission by the secondary usage node.

The beacon may include data indicating a beacon interval, and the first period, the second period, the third period, the fourth period and the fifth period may be repeated at an interval corresponding to the beacon interval.

The method may further include the step of: changing the beacon interval when a data rate required for the second communication service is changed.

The fifth period may be followed by a guard interval.

The method may further include the step of: receiving a notification indicating occurrence of collision of a beacon from a secondary usage node in the fourth period when collision of the beacon transmitted in the third period and another radio signal is detected by the secondary usage node.

The method may further include the step of: receiving data related to communication conditions of the first communication service or the second communication service sensed in a secondary usage node from the secondary usage node in the fourth period.

The method may further include the step of: receiving a reference signal for synchronizing periods among a plurality of communication devices from an external node of the communication device in the first period.

According to another embodiment of the present invention, there is provided a communication device including: a communication unit that is able to transmit and receive a radio signal for a second communication service making secondary usage of a spectrum assigned to a first communication service; and a control unit that controls communication by the communication unit, wherein the control unit controls the communication unit to receive a radio signal transmitted for the first communication service in a first period on a time axis, determines a parameter value to be used for controlling communication of the second communication service based on the radio signal received in the first period, senses a radio signal transmitted for the second communication service through the communication unit in a second period subsequent to the first period, and controls the communication unit to transmit a beacon for the second communication service based on the parameter value in a third period subsequent to the second period when a radio signal for the second communication service is not detected in the second period.

According to another embodiment of the present invention, there is provided a program causing a computer that controls a communication device including a communication unit that is able to transmit and receive a radio signal for a second communication service making secondary usage of a spectrum assigned to a first communication service to function as: a control unit that controls communication by the communication unit, the control unit executing a process including: controlling the communication unit to receive a radio signal transmitted for the first communication service in a first period on a time axis; determining a parameter value to be used for controlling communication of the second communication service based on the radio signal received in the first period; sensing a radio signal transmitted for the second communication service through the communication unit in a second period subsequent to the first period; and controlling the communication unit to transmit a beacon for the second communication service based on the parameter value in a third period subsequent to the second period when a radio signal for the second communication service is not detected in the second period.

According to the embodiments of the present invention described above, it is possible to provide a communication control method, a communication device and a program that can provide an effective framework for avoiding signal collision and suppressing interference on the occasion of secondary usage of a spectrum.

BRIEF DESCRIPTION OF THE DRAWINGS

FIG. 1A is a diagram showing a first example in which a primary usage node receives interference by secondary usage of a spectrum.

FIG. 2A is a first diagram to describe the effect of interference depending on a communication scheme and a channel direction.

FIG. 2B is a second diagram to describe the effect of interference depending on a communication scheme and a channel direction.

FIG. 2C is a third diagram to describe the effect of interference depending on a communication scheme and a channel direction.

FIG. 2D is a fourth diagram to describe the effect of interference depending on a communication scheme and a channel direction.

FIG. 3B is a second diagram to describe interference between second communication services.

FIG. 4 is an explanatory view to describe a framework for secondary usage of a spectrum.

FIG. 6B is a sequence chart showing the first scenario related to collision of secondary signals.

FIG. 14B is an explanatory view to describe the classification of locations of secondary usage nodes (SUE).

FIG. 20 is a flowchart showing an example of a flow of a secondary usage start process by the secondary usage node (SSC) according to the first embodiment.

FIG. 21 is an explanatory view to describe an application to TV band.

DETAILED DESCRIPTION OF THE EMBODIMENT(S)

Figure 1B:
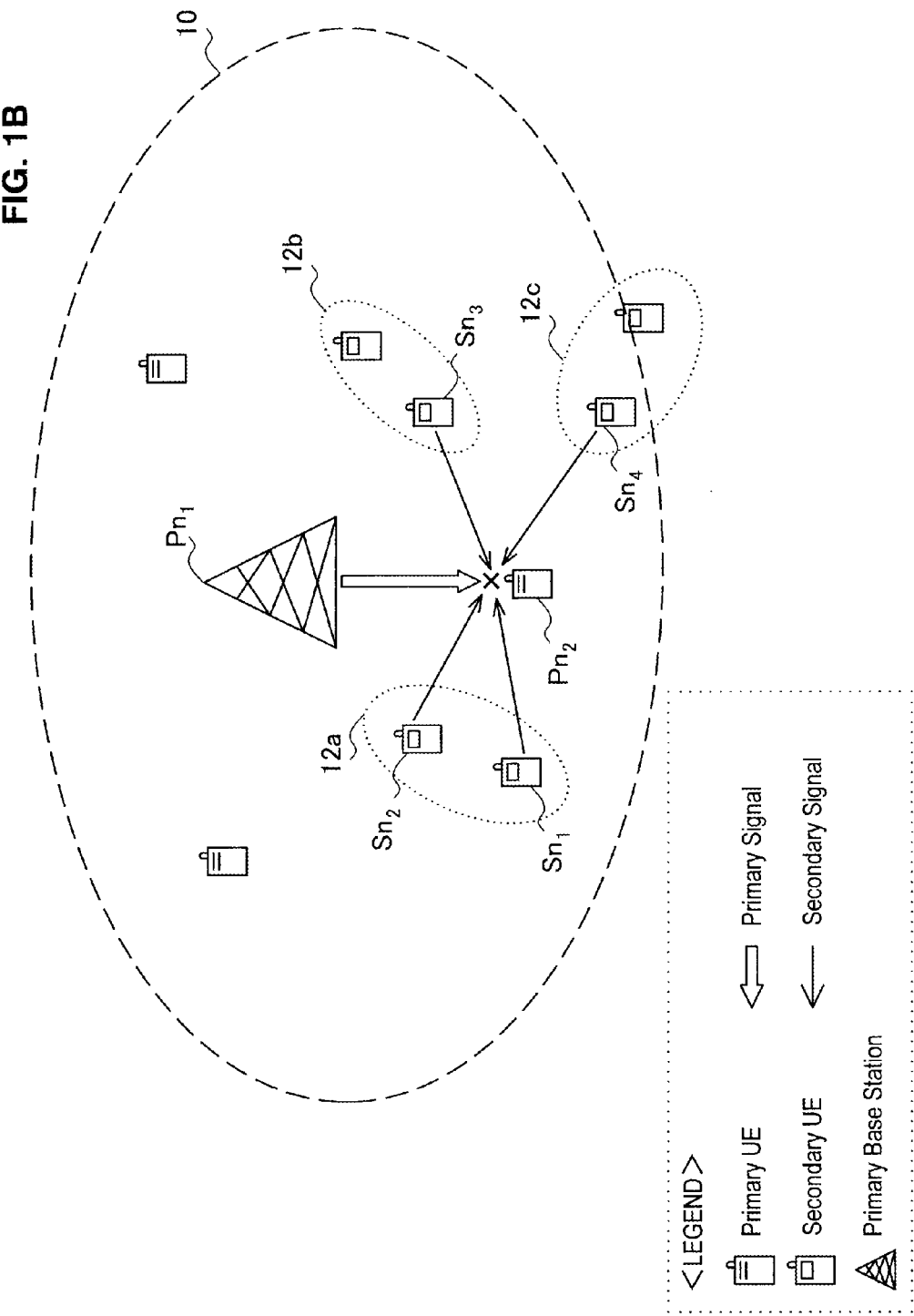
FIG. 1B is a diagram showing a second example in which a primary usage node receives interference by secondary usage of a spectrum.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Interference Control Model according to Embodiment
        1-1. Example of Interference by Secondary Usage of Spectrum
        1-2. Description of Interference Control Model
        1-3. Comparison of Channels for Secondary Usage
        1-4. Study on Interference between Second Communication Services
        1-5. Distribution of Transmission Powers among Second Communication Services
        1-6. Framework for Secondary Usage
        1-7. Detection of Collision and Method for Avoidance
        1-8. Scope of Term "Secondary Usage"
    2. First Embodiment
        2-1. Overview of Communication System
        2-2. Exemplary Configuration of Management Node
        2-3. Exemplary Configuration of Secondary Usage Node (SSC)
        2-4. Exemplary Configuration of Secondary Usage Node (SUE)
        2-5. Summary of First Embodiment
    3. Second Embodiment
        3-1. Overview of Communication System
        3-2. Exemplary Configuration of Management Node
        3-3. Exemplary Configuration of Secondary Usage Node (SSC)
        3-4. Summary of Second Embodiment
    4. Application to TV Band <1. Interference Control Model According to First Embodiment>

[1-1. Example of Interference by Secondary Usage of Spectrum]

Firstly, a case where a primary usage node receives interference due to secondary usage of a spectrum is described briefly with reference to FIGS. 1A and 1B. FIGS. 1A and 1B are diagrams respectively showing an example in which any primary usage node included in a primary system receives interference by secondary usage of a spectrum.

Referring to FIG. 1A, primary usage nodes $Pn_1$ and $Pn_2$ are located inside a cell 10 of a first communication service. The primary usage node $Pn_1$ is a base station (PBS: Primary Base Station) that provides the first communication service to a terminal device (which is also called UE: User Equipment) located inside the cell 10. The first communication service may be a given communication service including a digital TV broadcasting service, a satellite communication service, a mobile communication service or the like. On the other hand, the primary usage node $Pn_2$ is a terminal device (PUE: Primary User Equipment) that is provided with the first communication service. The primary usage node $Pn_1$, the primary usage node $Pn_2$, and the other primary usage nodes in the FIG. 1A transit and receive radio signals by using a spectrum assigned to the first communication service and thereby establishes a primary system.

FIG. 1A also shows a plurality of secondary usage nodes $Sn_1$, $Sn_2$, $Sn_3$ and $Sn_4$ located inside the cell 10. Those secondary usage nodes operate a second communication service by using a part or whole of the spectrum assigned to the first communication service (i.e. by making secondary usage of the spectrum) in accordance with a predetermined spectrum policy and thereby establishes a secondary system. The second communication service may be a radio communication service that is implemented in conformity with an arbitrary radio communication protocol such as IEEE802.11a/b/g/n/s, Zigbee or WiMedia, for example. A plurality of secondary systems may be established in a single cell, and, in the example of FIG. 1A, different secondary systems are established in an area 12a, an area 12b and an area 12c inside the cell 10. Note that, although the primary usage node and the secondary usage node are described separately for the sake of clarity of explanation, a part of the primary usage node may operate as the secondary usage node.

When the second communication service is operated inside the cell 10 of the first communication service as shown in FIG. 1A, there is a possibility that radio signals transmitted for the second communication service interfere with the first communication service. The example of FIG. 1A shows the possibility that radio signals transmitted from the secondary usage nodes $Sn_1$, $Sn_2$ and $Sn_3$ interfere with an uplink signal transmitted from the primary usage node $Pn_2$ to the primary usage node $Pn_1$. In this case, there is a possibility that the primary usage node $Pn_1$ fails to normally receive the uplink signal, or, even if it receives it, fails to obtain the desired service quality.

In FIG. 1B, just like FIG. 1A, the primary usage nodes $Pn_1$ and $Pn_2$ are located inside the cell 10 of the first communication service, and the primary usage node $Pn_1$ serving as a base station provides the first communication service to the primary usage node $Pn_2$ serving as a terminal device. Further, the secondary usage nodes $Sn_1$, $Sn_2$, $Sn_3$ and $Sn_4$ are shown inside the cell 10 of the first communication service. The example of FIG. 1B shows the possibility that radio signals transmitted from the secondary usage nodes $Sn_1$, $Sn_2$, $Sn_3$ and $Sn_4$ interfere with a downlink signal transmitted from the primary usage node $Pn_1$ to the primary usage node $Pn_2$. In this case, there is a possibility that the primary usage node $Pn_2$ fails to normally receive the downlink signal, or, even if it receives it, fails to obtain the desired service quality.

One solution to prevent such interference by secondary usage of a spectrum and avoid an adverse effect such as degradation of communication quality on the first communication service is to reduce a transmission power that is used for transmission of radio signals from the secondary usage nodes. On the other hand, reduction of a transmission power leads to a decrease in the capacity of the second communication service and degradation of communication quality. Therefore, it is effective to increase a transmission power for the second communication service as much as possible within the range that does not cause interference on the first communication service. Thus, a relationship between interference on the first communication service due to secondary usage of a spectrum and a transmission power used in the secondary usage nodes is described hereinbelow.

[1-2. Description of Interference Control Model]

Focusing attention on one-to-one relationship between the secondary usage node on the part of giving interference due to secondary usage and the primary usage node on the part of receiving interference (which is referred to hereinafter as an interfered node), it is necessary to satisfy the following relational expression (1) in order for the interference to be accepted in the interfered node. Note that the interfered node can correspond to the primary usage node $Pn_1$ in FIG. 1A or the primary usage node $Pn_2$ in FIG. 1B, for example.

Expression (1)

$$SINR_{required} \leq \frac{P_{rx\_primary,primary}}{P_{rx\_primary,secondary} + N_{primary}}$$

In the above expression, $SINR_{required}$ indicates the minimum SINR (Signal to Interference and Noise Ratio) that is required in the interfered node. $SINR_{required}$ may be the minimum receiving sensitivity of the interfered node, the minimum SINR given according to QoS (Quality of Service) or the like, for example. Further, $P_{rx\_primary,primary}$ indicates the reception level of a radio signal that is required in the first communication service, and $P_{rx\_primary,secondary}$ indicates the reception level of a radio signal that is transmitted from the secondary usage node in the interfered node. Further, $N_{primary}$ indicates the interference or noise level (including one or both of the interference level and the noise level) that can be applied to the interfered node.

Further, the reception level of a radio signal is represented by the transmission power of a radio signal and the path loss as shown in the following relational expressions (2) and (3).

$$P_{rx\_primary,secondary} = P_{tx\_secondary} / L_{path\_tx\_secondary} \quad \text{Expression (2)}$$

$$P_{rx\_primary,primary} = P_{tx\_primary} / L_{path\_tx\_primary} \quad \text{Expression (3)}$$

In the above expression, $P_{tx\_secondary}$ indicates the transmission power of a radio signal in the secondary usage node, and $L_{path\_tx\_secondary}$ indicates the path loss on the communication path from the secondary usage node to the interfered node. Further, $P_{tx\_primary}$ indicates the transmission power of a radio signal in the first communication service, and $L_{path\_tx\_primary}$ indicates the path loss on the communication path of a radio signal in the first communication service. Thus, the above relational expression (1) is deformed into the following expression.

Expression (4)

$$SINR_{required} \leq \frac{P_{rx\_primary,primary}}{P_{tx\_secondary} / L_{path\_tx\_secondary} + N_{primary}}$$

Note that the interference or noise level $N_{primary}$ included in the expression (1) and the expression (4) can be calculated by the following expression, for example, with use of the Boltzmann constant $k=1.38\times10^{-23}$[J/K], the absolute temperature T[K], the noise figure NF and the bandwidth BW[Hz].

$$N_{primary}=I_{primary}+10^{10\ log_{10}(kT)+NF+10\ log_{10}(BW)} \quad \text{Expression (5)}$$

In the above expression, $I_{primary}$ may include inter-cell interference in the first communication service, intra-cell interference in a heterogeneous environment where a femto-cell, a small cell or a relay node is overlaid by a macrocell, interference by out-of-band radiation or the like. Further, the path loss on the communication path of a radio signal typically depends on the distance d between two nodes, and it can be calculated by the following expression, for example.

$$L_{path}(d)=10^{\frac{-10-log_{10}\left(\frac{\lambda}{4\pi d_0}\right)^2+10n\log_{10}\left(\frac{d}{d_0}\right)}{10}} \quad \text{Expression (6)}$$

In the above expression, $d_0$ indicates the reference distance, $\lambda$ indicates the wavelength of a carrier frequency, and n indicates the propagation constant.

The relational expression (4) is further deformed into the following expression.

$$P_{tx\_secondary} \leq \left(\frac{P_{rx\_primary,primary}}{SINR_{required}} - N_{primary}\right) \cdot L_{path\_tx\_secondary} \quad \text{Expression (7)}$$

If the transmission power of the secondary usage node is controlled so as to satisfy the relational expression (7), the interference can be accepted in the interfered node at least concerning the one-to-one relationship between the secondary usage node and the interfered node. Further, when a plurality of secondary usage nodes exist, it is needed to satisfy the following relational expression if the total number of secondary usage nodes acting as the source of interference is n.

$$\sum_{i=1}^{n}\left(\frac{P_{tx\_secondary,i}}{L_{path\_tx\_secondary,i}}\right) \leq \frac{P_{rx\_primary,primary}}{SINR_{required}} - N_{primary} \quad \text{Expression (8)}$$

Consequently, on the assumption that the largest possible capacity or the highest possible communication quality should be obtained in the second communication service as well, the interference power level $I_{acceptable}$ which is acceptable for the second communication service as a whole is given by the following expression.

$$\sum_{i=1}^{n}\left(\frac{P_{tx\_secondary,i}}{L_{path\_tx\_secondary,i}}\right) = \frac{P_{rx\_primary,primary}}{SINR_{required}} - N_{primary}(=I_{acceptable}) \quad \text{Expression (9)}$$

Herein, since the parameters in the right-hand member of the expression (9) and the value of the path loss $L_{path\_tx\_secondary,i}$ are known, only the transmission power $P_{tx\_secondary,i}$ depending on the interference power level $I_{acceptable}$ becomes a parameter to be determined. It may be understood that the expression (9) is an estimation formula to estimate the total sum of acceptable interference powers on the primary system due to secondary systems.

Specifically, as for a certain secondary usage node that makes secondary usage of the spectrum assigned to the first communication service, it is desirable to control transmission powers of secondary usage nodes in such a way that the transmission powers satisfy the expression (9) as a whole.

[1-3. Comparison of Channels for Secondary Usage]

FIGS. 2A to 2D are diagrams to describe the effect of interference on the occasion of secondary usage, depending on a communication scheme and a channel direction used in the first communication service.

FIGS. 2A to 2D show a primary usage node $Pn_1$ serving as a base station and three primary usage nodes $Pn_2$, $Pn_3$ and $Pn_4$ serving as PUEs. The primary usage nodes $Pn_1$, $Pn_2$, $Pn_3$ and $Pn_4$ establish a primary system by using OFDMA (Orthogonal Frequency Division Multiple Access) in the examples of FIGS. 2A and 2B. The primary system in this case may be WiMAX (registered trademark) system, LTE (Long Term Evolution) system, LTE-A (LTE-Advanced) system or the like, for example. Further, the primary usage nodes $Pn_1$, $Pn_2$, $Pn_3$ and $Pn_4$ establish a primary system by using CDMA (Code Division Multiple Access) in the examples of FIGS. 2C and 2D. The primary system in this case may be a UMTS (Universal Mobile Telecommunications System), W-CDMA (Wideband-CDMA) or the like, for example.

FIGS. 2A to 2D also show a secondary usage node $Sn_1$. The secondary usage node $Sn_1$ transmits and receives a radio signal (secondary signal) for the second communication service to and from another secondary usage node located in an area 12a, which can cause interference on the primary usage nodes $Pn_1$, $Pn_2$, $Pn_3$ and $Pn_4$. The influential range of the interference depends on a communication scheme and a channel direction of the first communication service which is the target of secondary usage.

Referring first to FIG. 2A, when secondary usage is made on an uplink channel of the OFDMA system, interference can occur only on an uplink signal from any one PUE to the base station in the primary system. In the example of FIG. 2A, the secondary signal from the secondary usage node $Sn_1$ interferes with the uplink signal from the primary usage node $Pn_2$ to the primary usage node (base station) $Pn_1$. In this case, the uplink signals from the other PUEs are not affected by the secondary signal because they are allocated in advance to different resource blocks (or different frequency slots or time slots).

Referring next to FIG. 2B, when secondary usage is made on a downlink channel of the OFDMA system, interference can occur on downlink signals from the base station to the respective PUEs in the primary system. In the example of FIG. 2B, the secondary signal from the secondary usage node $Sn_1$ interferes with the downlink signals from the primary usage node (base station) $Pn_1$ to the primary usage nodes $Pn_2$, $Pn_3$ and $Pn_4$. This is because the downlink signals (e.g. signals of a control channel) can be transmitted by using a common resource block or the like to the plurality of PUEs.

Referring then to FIG. 2C, when secondary usage is made on an uplink channel of the CDMA system, interference can occur on uplink signals from the respective PUEs to the base station in the primary system. In the example of FIG. 2C, the secondary signal from the secondary usage node $Sn_1$ interferes with the uplink signals from the primary usage nodes $Pn_2$, $Pn_3$ and $Pn_4$ to the primary usage node (base station) $Pn_1$. Because the primary signals are typically spread to the entire band by using spread codes assigned to the respective PUEs and transmitted simultaneously in the CDMA system, the secondary signal can interfere with the primary signals from the plurality of PUEs.

Referring further to FIG. 2D, when secondary usage is made on a downlink channel of the CDMA system, interference can occur on downlink signals from the base station to the respective PUEs in the primary system. In the example of FIG. 2D, the secondary signal from the secondary usage node $Sn_1$ interferes with the downlink signals from the primary usage node (base station) $Pn_1$ to the primary usage nodes $Pn_2$, $Pn_3$ and $Pn_4$. This is because the downlink signals (e.g. signals of a control channel) can be received in common by the plurality of PUEs and because the primary signals are spread to the entire band and transmitted simultaneously as in the uplink channel of the CDMA system.

The influential range of interference and the technical requirements in the case of using the above-described four types of channels for secondary usage are summarized in the following table 1.

TABLE 1

Table 1. Influential range of interference and technical requirements

| Communication scheme | Channel direction | | | |
|---|---|---|---|---|
| | Uplink | | Downlink | |
| OFDMA | Interfered node | BS | Interfered node | UEs |
| | Interfered link | a UE -> BS | Interfered link | BS -> UEs |
| | Functional requirement | UL synchronization | Functional requirement | DL synchronization (Control channel identification) |
| | Minimum receiving sensitivity | −90 dBm | Minimum receiving sensitivity | −90 dBm |
| CDMA | Interfered node | BS | Interfered node | UE |
| | Interfered link | UEs -> BS | Interfered link | BS -> UEs |
| | Functional requirement | Code detection | Functional requirement | Code detection |
| | Minimum receiving sensitivity | −120 dBm | Minimum receiving sensitivity | −120 dBm |

Referring to the table 1, the influential range of interference is the smallest in the uplink channel of the OFDMA system as described above. Specifically, interfere can occur only on the link from one UE ("a UE") to the base station when making secondary usage of an uplink channel of the OFDMA system, whereas interfere can occur on the links related to a plurality of UEs when making secondary usage of another channel. In terms of functional requirements, detection of the spread code is necessary for sensing of the primary signal in the CDMA system, whereas only UL (uplink) or DL (downlink) synchronization is necessary in the OFDMA system, so that the CDMA system can be implemented more readily. Further, the minimum receiving sensitivity is −120 dBm (in the case of UMTS) in the CDMA system, whereas it is −90 dBm (in the case of WiMAX) in the OFDMA system, for example, and it is less subject to interference in the OFDMA system. Thus, on the occasion of secondary usage of a spectrum, it is desired to make secondary usage of the spectrum of the uplink channel, particularly, in the spectrum of the first communication service that employs the OFDMA scheme. In light of this, an embodiment which is described later in this specification is based on the assumption that secondary usage is made on the uplink channel of the OFDMA system. Note, however, that the present invention is applicable to the downlink channel of the OFDMA system or channels using a communication system other than the OFDMA system.

[1-4. Study on Interference Between Second Communication Services]

Interference which secondary usage of a spectrum causes on the first communication service is described above. Hereinafter, interference between second communication services in the case where there are a plurality of second communication services that make secondary usage of the spectrum assigned to the first communication service is described.

Figure 3A:
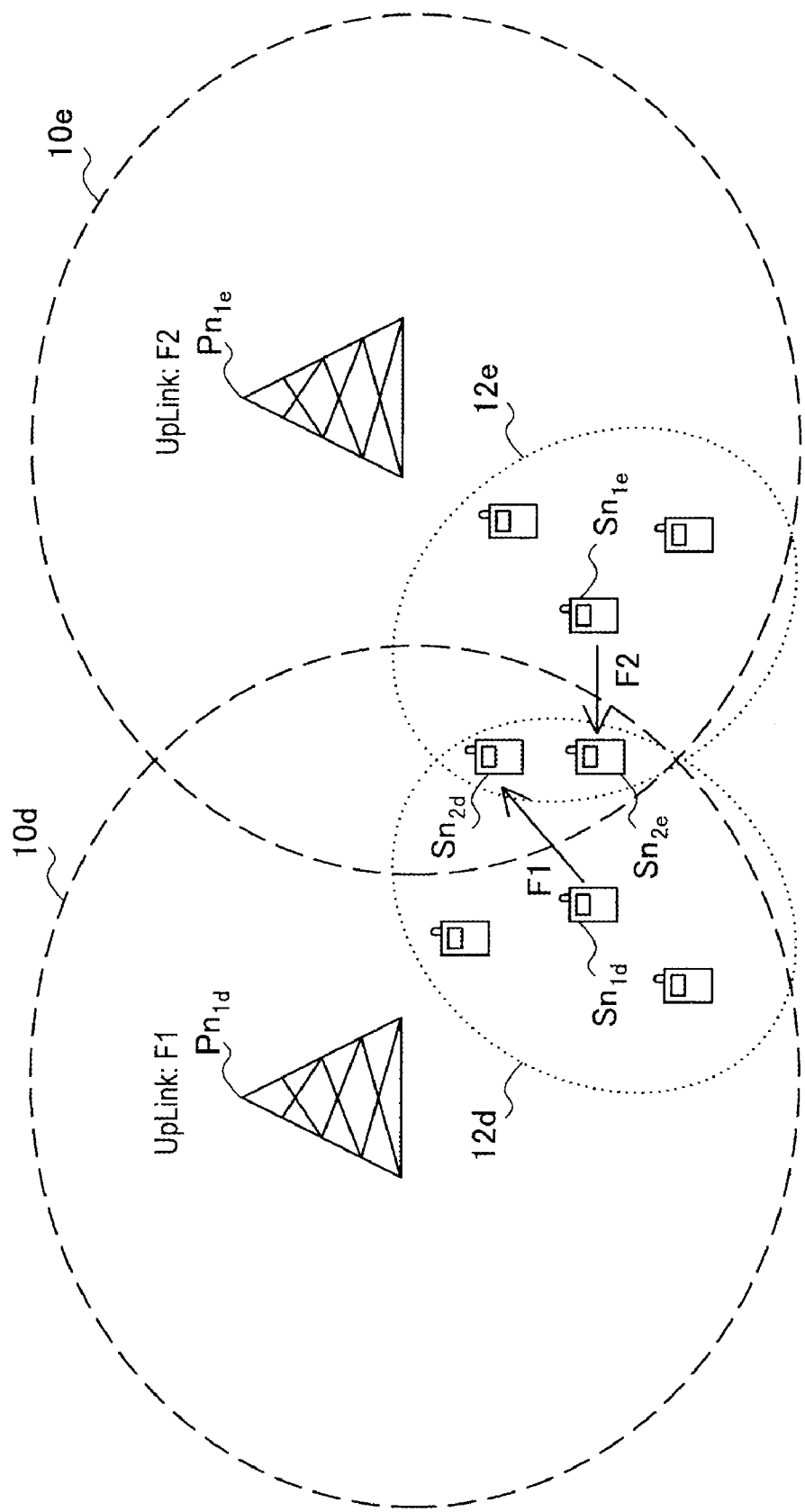
FIG. 3A is a first diagram to describe interference between second communication services.

FIGS. 3A and 3B are diagrams to describe interference between second communication services. FIG. 3A shows an example in which second communication services are respectively operated in different adjacent cells. On the other hand, FIG. 3B shows an example in which two second communication services are operated in the same cell.

FIG. 3A shows a primary usage node $Pn_{1d}$ which is a base station located inside a cell $10d$ and a primary usage node $Pn_{1e}$ which is a base station located inside a cell $10e$. Further, secondary usage nodes $Sn_{1d}$ and $Sn_{2d}$ and a secondary usage node $Sn_{2e}$ are included inside the cell $10d$. Secondary usage nodes $Sn_{1e}$ and $Sn_{2e}$ and a secondary usage node $Sn_{2d}$ are included inside the cell $10e$. The secondary usage nodes $Sn_{1d}$ and $Sn_{2d}$ operate the second communication service inside an area $12d$. Further, the secondary usage nodes $Sn_{1e}$ and $Sn_{2e}$ operate the second communication service inside an area $12e$.

When the first communication service employs the OFDMA scheme, for example, different frequencies are typically assigned as channel frequencies used between adjacent cells by interference avoidance algorithm between the adjacent cells. In the example of FIG. 3A, an uplink channel frequency of the cell $10d$ is F1, and an uplink channel frequency of the cell $10e$ is F2. Therefore, when the uplink channel of the OFDMA scheme is the target of secondary usage, the frequency used for communication between the secondary usage nodes $Sn_{1d}$ and $Sn_{2d}$ is F1, and the frequency used for communication between the secondary usage nodes $Sn_{1e}$ and $Sn_{2e}$ is F2. As a result, although the area $12d$ and the area $12e$ overlap with each other in the example of FIG. 3A, the secondary signals transmitted and received by the secondary usage nodes $Sn_{2d}$ and $Sn_{2e}$ that are located in the overlapping part do not interfere (or collide) with each other.

On the other hand, FIG. 3B shows a primary usage node $Pn_{1d}$ which is a base station located inside a cell $10d$. Further, secondary usage nodes $Sn_{1d}$ and $Sn_{2d}$ and secondary usage nodes $Sn_{1f}$ and $Sn_{2f}$ are included inside the cell $10d$. The secondary usage nodes $Sn_{1d}$ and $Sn_{2d}$ operate the second communication service inside an area $12d$. Further, the secondary usage nodes $Sn_{1f}$ and $Sn_{2f}$ operate the second communication service inside an area $12f$. In this case, the frequency used for communication between the secondary usage nodes $Sn_{1d}$ and $Sn_{2d}$ and the frequency used for communication between the secondary usage nodes $Sn_{1f}$ and $Sn_{2f}$ are both F1. As a result, the secondary signals transmitted and received by the secondary usage node $Sn_{2d}$ and the secondary usage node $Sn_{2f}$ that are located in the part where the area $12d$ and the area $12f$ overlap with each other are likely to interfere with each other.

It is therefore understood that, when operating the second communication service by making secondary usage of the uplink channel of the OFDMA system, for example, in the spectrum assigned to the first communication service, it is desirable to give consideration to the existence of another second communication service at least in the same cell.

[1-5. Distribution of Transmission Powers Among Second Communication Services]

When the acceptable interference power of the second communication service is determined according to the above-described interference control model, if two or more second communication services exist in the same cell, it is necessary to further distribute a transmission power depending on the acceptable interference power among those second communication services. For example, in the case where a plurality of secondary usage nodes act as coordinators and start secondary usage of a spectrum, it is necessary to control their transmission powers so that the transmission powers of beacons that are transmitted from the respective coordinators satisfy the acceptable interference power as a whole. Further, the transmission power can be further distributed among the secondary usage nodes that subscribe to the second communication services. As a guideline for distributing the transmission power, three rules, i.e. equal type, unequal type and interfering margin reduction type, are proposed.

(Equal Type)

The equal type is a distribution rule that equally allocates transmission powers depending on the acceptable interference power that is determined according to the above-described interference control model to two or more second communication services. In the equal type distribution rule, the value $P_{tx\_secondary,i}$ of the transmission power which is allocated to the i-th (i=1, ..., n) second communication service among n-number of second communication services is derived from the following expression.

$$P_{tx\_secondary,i} = \frac{1}{K} \cdot \left( \frac{P_{rx\_primary,primary}}{SINR_{required}} - N_{primary} \right), \quad \text{Expression (10)}$$

$$K = \sum_{i=1}^{n} \frac{1}{L_{path\_tx\_secondary,i}}$$

The right side of the expression (10) is dividing the right side of the expression (9) by the factor K on the basis of path loss $L_{path\_tx\_secondary,i}$. Such a transmission power distribution rule equally provides the opportunity of communication to the coordinators of the respective second communication services, and it is fair and clear as a service from the user's point of view. However, the interference levels on the primary usage node caused by the respective secondary usage nodes are uneven. Note that, in the case of distributing the transmission power among the secondary usage nodes that subscribe to the second communication service, the value of n used to determine the factor K may be the total number of secondary usage nodes that subscribe to the second communication service instead of the total number of second communication services.

(Unequal Type)

The unequal type is a distribution rule that unequally allocates transmission powers depending on the acceptable interference power that is determined according to the above-described interference control model to two or more second communication services. In the unequal type distribution rule, the value $P_{tx\_secondary,i}$ of the transmission power depends on the distance between the secondary usage node and the interfered node and is derived from the following expression.

$$P_{tx\_secondary,i} = \quad \text{Expression (11)}$$

$$\frac{1}{n} \cdot \left( \frac{P_{rx\_primary,primary}}{SINR_{required}} - N_{primary} \right) \cdot L_{path\_tx\_secondary,i}$$

The right side of the expression (11) is assigning weights at the ratio of the path loss for each secondary usage node relative to the total sum of the path losses to the value obtained by dividing the right side of the expression (9) by the total number n of second communication services. With such a transmission power distribution rule, the secondary usage node that is more distant from the interfered node can gain larger opportunity of communication or communication distance. The entire communication range can be thereby maximized.

(Interfering Margin Reduction Type)

The interfering margin reduction type is a distribution rule that estimates the number of secondary usage nodes serving as the source of interference so as to include an extra number and thereby further reduces the possibility of causing interference on the primary usage node (i.e. provides "interference margin"). In the interfering margin reduction type distribution rule, the value $P_{tx\_secondary,i}$ of the transmission power is derived from the following expression.

$$P_{tx\_secondary,i} = \left( \frac{P_{rx\_primary,primary}}{SINR_{required}} - N_{primary} \right). \quad \text{Expression (12)}$$

$$L_{path\_tx\_secondary,i} / N_{estimation}$$

In the expression (12), $N_{estimation}$ indicates the estimated total number of secondary usage nodes serving as the source of interference which is estimated inclusive of an extra number. For example, the value of $N_{estimation}$ may be set so that the transmission power decreases by 10[dB] if the total number of secondary usage nodes serving as the source of interference is 10, and the transmission power decreases by 20[dB] if it is 100.

The features of the three transmission power distribution rules are summarized in the following table 2.

TABLE 2

Table 2. Features of transmission power distribution rules

| | |
|---|---|
| Equal type | Communication opportunity is equally provided to respective communication services |
| | Fair and clear as service |
| | Interference levels on primary usage node are uneven |
| Unequal type | Larger communication distance is obtained with distance from interfered node |
| | Entire communication range can be maximized |
| Interfering margin reduction type | Possibility of causing interference is further reduced by setting of interference margin |
| | Transmission power can be set autonomously by secondary usage node (coordinate) |
| | Communication opportunity or communication distance decreases with the estimated total number of interference sources |

It should be noted that a node that distributes a transmission power may distribute the transmission power according to one rule that is previously selected among the above-described three transmission power distribution rules. Alternatively, a node that distributes a transmission power may distribute the transmission power by adaptively selecting the rule that consequently maximizes an evaluation value such as the sum of capacities given to all secondary usage nodes (or secondary usage nodes with a high priority) or the total number of established secondary links

[1-6. Framework for Secondary Usage]

In the acceptable transmission power determination process and the transmission power distribution process according to the above-described interference control model, data including location data of an interfered node (e.g. a base station etc.) of the primary system, location data of a secondary usage node, path loss or the like are used. Thus, on the occasion of secondary usage of a spectrum, it is suitable to control the second communication service in a centric manner by using a special (typically, single) secondary usage node that can access to the location data of the interfered node of the primary system or the like. In this specification, such a secondary usage node that acts as the center of control of the second communication service is referred to as a SSC (Secondary Spectrum Coordinator).

FIG. 4 is an explanatory view to describe a framework for secondary usage of a spectrum on the assumption that the SSC controls the second communication service in a centric manner.

Referring to FIG. 4, a framework which is repeated at an interval corresponding to a beacon interval $T_b$ is shown along the time axis. One cycle period includes six periods from the first period (#1) to the sixth period (#6). The second period (#2) to the sixth period (#6) constitute a super frame for the second communication service.

The first period (#1) is a primary sensing period. In the first period, sensing of a primary signal is performed by the SSC. For example, the SSC identifies the control channel of the first communication service and achieves synchronization of the uplink channel in the first period. Further, in the first period, the SSC receives the location data of an interfered node (e.g. a base station of the primary system etc.), the value of an acceptable transmission power, a spectrum mask, a modulation method to be used for secondary usage or the like which are transmitted on the control channel, for example. The SSC can thereby determine a parameter value such as a transmission power, a frequency or the order of modulation to be used for controlling communication of the second communication service.

Further, in the first period (#1), a reference signal for synchronizing the timing of the super frame illustrated in FIG. 4 among a plurality of SSCs may be supplied. The reference signal may be a signal that notifies the start timing of the first period (#1) and the beacon interval $T_b$, for example. Further, the reference signal may include a clock signal, for example. The reference signal can be supplied from a management node that manages secondary usage of a spectrum in common to a plurality of SSCs, for example. In this case, the opportunity of communication after the second period (#2), which is described later, can be given equally (or evenly) by using a random backoff procedure or given unequally depending on the priories of the respective SSCs.

Note that, when it is determined as a result of sensing of the primary signal that it is unable to use a sufficient transmission power for operating the second communication service, further sensing may be attempted in the first period in order to detect another channel to be used for secondary usage. Further, when it is possible to perform sensing of a plurality of channels at a time, the SSC may perform sensing of each of the plurality of channels and determine each parameter value for controlling communication of the second communication service. In this case, the SSC can present choices of two or more channels which the SUE can use for secondary usage by using a beacon in the third or fourth period, which is described later. If the two or more channels that are presented as choices are channels whose frequencies are as close as possible, the load of a device that subscribes to the second communication service can be reduced. A plurality of channels as the target of sensing may be channels used for primary usage in two or more adjacent cells or two or more channels used in a composite manner in one cell by spectrum aggregation adopted in LTE-A or the like. The respective channels can be typically distinguished as one massed band on the basis of a certain center frequency (for example, in the case of LTE, there are operation modes of bandwidths of 5 MHz, 10 MHz, 15 MHz and 20 MHz). Alternatively, a minimum unit of resource scheduling (for example, in the case of LTE, a resource block including 12 OFDM sub-carriers is the minimum unit of resource scheduling), for example, may be treated as each channel The second period (#2) is a secondary sensing period. In the second period, sensing of a secondary signal is performed by the SSC. The sensing is performed mainly for the purpose of avoiding collision of secondary signals between adjacent sub-cells. Specifically, the SSC senses the presence or absence of a secondary signal transmitted from another communication device in the second period. If a secondary signal transmitted from another communication device is not detected, the SSC transmits a beacon, which is described later, in the third period subsequent to the second period. On the other hand, if a secondary signal is detected in the second period, the SSC attempts to transmit a beacon after the lapse of a given time. In this regard, it is preferred that the SSC adds information related to the time to finish the super frame or the end time of the super frame to a beacon (or another secondary signal) transmitted from itself, for example. Another SSC which has detected the secondary signal in the second period can thereby figure out a waiting time (the above-mentioned given time) until its own beacon becomes transmittable by decoding the secondary signal and acquiring the above information.

The third period (#3) is a control frame transmission period. When a secondary signal transmitted from another communication device is not detected in the second period, for example, the SSC transmits a beacon for the second communication service in the third period. The transmission power of the beacon is set to a value that is determined based on the radio signal received in the first period, for example. Further, data such as an identifier (sub-cell ID etc.) for identifying each second communication service and a transmission power value indicating the transmission power of the beacon is included in the beacon. The beacon is received by a secondary usage node (SUE: Secondary User Equipment) located in the nearby vicinity of the SSC. Then, the SUE which desires to perform data communication by the second communication service transmits a connection request to the second communication service to the SSC in the fourth period subsequent to the third period.

When there are two or more channels that can be used for secondary usage, the SSC may transmit beacons on the respective channels in parallel in the third period. In this case, each beacon can include the parameter value determined for the channel corresponding to the beacon.

The fourth period (#4) is a connection and scheduling period. In the fourth period, the SSC receives the connection request to the second communication service from the SUE. Then, the SSC executes association and authentication for the received connection request and then performs scheduling for the SUE for which permission for connection is to be made. Specifically, the SSC assigns each SUE for which permission for connection is to be made to each of slots 1 to n included in the fifth period, which is described later, for example (on the first-come basis etc.). Then, the SSC broadcasts assignment information (scheduling information) of the SUE in each slot.

Each SUE can thereby recognize the slot assigned to itself and perform data communication by the second communication service in the assigned slot.

Note that the SUE in which data to be communicated by the second communication service in the super frame at the current point of time is not generated may continue to perform sensing of a primary signal or a secondary signal up to the third period and then report a result of sensing to the SSC in the fourth period. Alternatively, the SUE may report a result of sensing to the SSC in the fifth period of a slot which is obtained for the next opportunity of connection. The reported result of sensing may include data related to communication conditions indicating the reception level of a primary signal or a secondary signal, the existence of a primary usage node or a secondary usage node in close proximity or the like, for example. The SSC can thereby more accurately grasp the surrounding communication conditions and improve the accuracy of interference control.

Further, when beacons are transmitted in parallel on two or more channels that can be used for secondary usage, the SUE may receive the two or more beacons and select a channel with the best reception condition (e.g. a channel with the highest beacon reception level etc.). In this case, the SUE can transmit a connection request as a response to the beacon to the SUE on the selected channel The fifth period (#5) is a data communication period. The fifth period typically includes a plurality of slots 1 to n (which can be distinguished from one another by a time, a frequency, a code, or a combination of those) as shown in FIG. 4. Each SUE performs data communication by the second communication service in any of the plurality of slots 1 to n according to the scheduling information provided from the SSC in the fourth period.

The sixth period (#6) is a guard time period. The sixth period can be referred to also as a guard interval. By the sixth period, it is possible to avoid that a radio signal that is delayed on the communication path and a radio signal transmitted in the next cycle interfere with each other to cause degradation of communication quality. The length of the sixth period can be set as $T_d+\alpha$, which is the time obtained by adding a given time $\alpha$ to the time $T_d$, $T_d$ being the time for a packet transmitted in the last slot of the fifth period to reach the SSC, for example.

As described above, the second period to the sixth period shown in FIG. 4 constitute one super frame for the second communication service. Further, those periods are repeated at an interval corresponding to the beacon interval $T_b$. However, when it is determined as a result of sensing a primary signal in the first period that it is unable to use a sufficient transmission power for operating the second communication service, for example, the SSC continues to perform sensing of a primary signal. In this case, further sensing of a primary signal is performed by the SSC (and/or the SUE) instead of that the super frame including the second period to the sixth period appears periodically.

Figure 5:
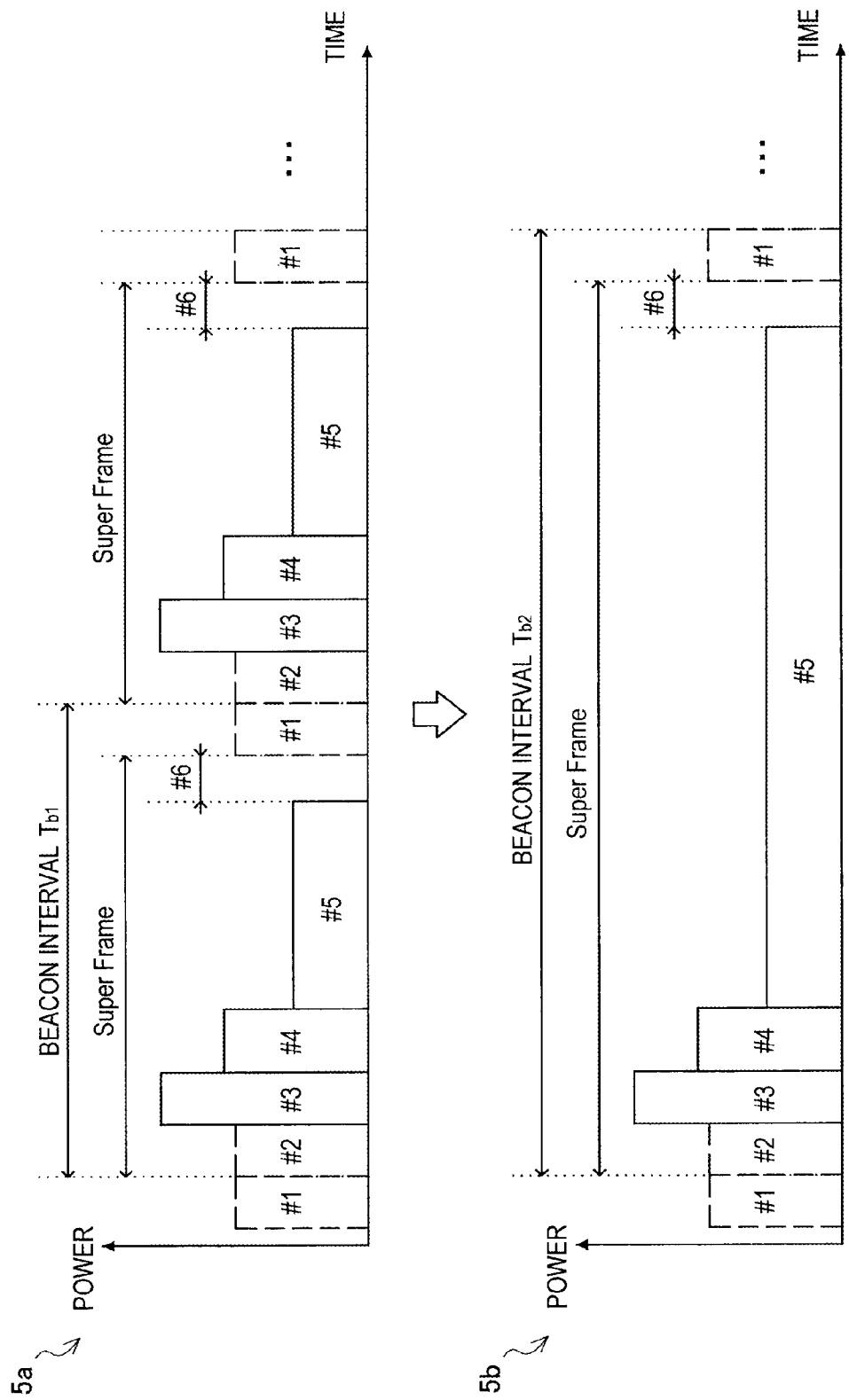
FIG. 5 is an explanatory view showing the way a beacon interval for secondary usage of a spectrum is changed.

Further, the beacon interval $T_b$ shown in FIG. 4 is not necessarily a fixed interval. Specifically, when a required data rate for an application to be implemented on the second communication service is high, for example, the beacon interval $T_b$ may be dynamically changed to a longer interval in order to increase the proportion of the data communication period (the fifth period) to the super frame. For example, in the example of FIG. 5, a beacon interval $T_{b1}$ (cf. 5a) having the same length as the beacon interval $T_b$ shown in FIG. 4 is changed to a beacon interval $T_{b2}$ (cf. 5b), so that the proportion of the data communication period to one super frame increases. Note that, in this case, it is preferred that the SSC inserts the value of the next beacon interval to a beacon transmitted in the third period. The SUE (or another SSC located in the nearby vicinity) which has received the beacon can thereby autonomously synchronize the operation of its own equipment with a new beacon interval. Further, the SUE which has received the beacon and detected a change in beacon interval may insert the value of the new beacon interval to a frame transmitted from itself in the same super frame. The SUE (or another SSC) located in the position where a beacon from the SSC is not directly receivable can thereby also recognize a change in beacon interval.

Although it is described above that the SSC can perform sensing of a plurality of channels at a time in the first period, a configuration of a receiver for sensing a plurality of channels at a time may be as follows. For example, the SSC simultaneously receives radio signals over a plurality of channels by using a wide-band filter, a filter bank or the like and performs demodulation processing in accordance with a channel where a signal level of a received signal (in either analog region or digital region such as RSSI) is a given threshold or higher. The SSC can thereby perform sensing of a plurality of channels at a time. For example, in 40M mode of IEEE 802.11n, assuming the coexistence with a legacy terminal, a power is measured regarding an FFT processing result of a baseband signal after A/D conversion, and it can be determined which of the 40M full channel or the lower 20 MHz or the higher 20 MHz of 40 MHz is used. According to the determination result, the operation of the subsequent digital modulation is changed dynamically. Such a configuration of a receiver may be applied to sensing of a plurality of channels by the SSC.

[1-7. Detection of Collision and Method for Avoidance]

The second communication service is controlled in a centric manner by the SSC that has a role of a coordinator according to the framework described above with reference to FIGS. 4 and 5. In this case, a transmission power of a beacon is determined by the SSC according to the above-described interference control model. Further, a transmission power to be used by the SUE for transmission of a connection request or data communication can be determined by the SUE based on a beacon transmitted from the SSC (this is further described later). It is thereby possible to prevent substantial interference from occurring in the primary system due to secondary usage of a spectrum. However, because the framework adopts a communication procedure in CSMA (Carrier Sense Multiple Access) particularly in the second period and the third period, there is a possibility that collision of secondary signals can occur. Therefore, a technique of detecting and avoiding collision of secondary signals is described hereinafter with reference to FIGS. 6 and 7.

(First Scenario)

Figure 6A:
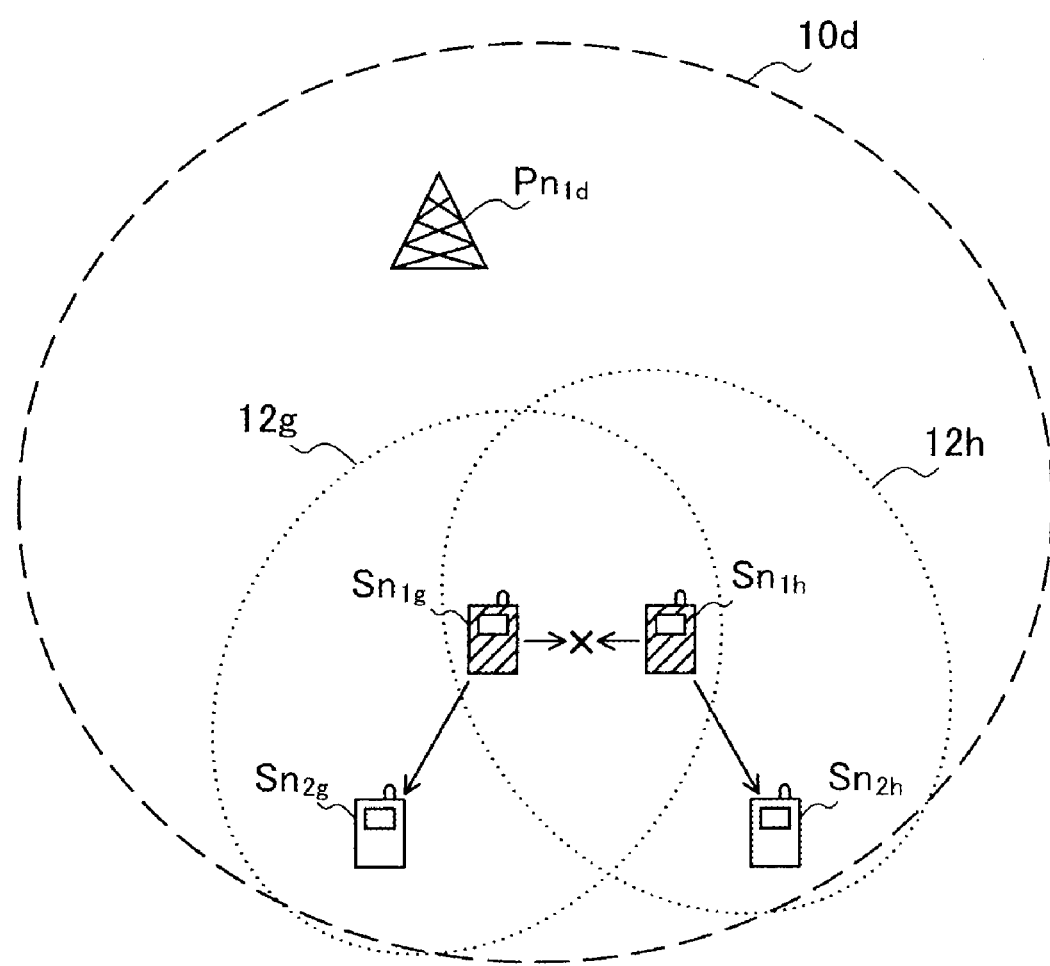
FIG. 6A is a diagram showing a positional relationship of secondary usage nodes in a first scenario related to collision of secondary signals.

FIGS. 6A and 6B are explanatory views to describe a first scenario in which collision of secondary signals occurs in the framework described above with reference to FIG. 4. FIG. 6A shows a positional relationship of secondary usage nodes in the first scenario. FIG. 6B is a sequence chart showing an example of a flow of communication according to the first scenario.

Referring to FIG. 6A, a base station $Pn_{1d}$ that provides the first communication service inside the cell 10d and secondary usage nodes $Sn_{1g}$, $Sn_{2g}$, $Sn_{1h}$, and $Sn_{2h}$ that make secondary usage of the spectrum assigned to the first communication service are shown. The secondary usage node $Sn_{1g}$ acts as a coordinator of the second communication service and transmits a beacon for the second communication service to a secondary usage node located inside the area 12g. The secondary usage node $Sn_{1h}$ also acts as a coordinator of the second communication service and transmits a beacon for the second communication service to a secondary usage node located inside the area 12h. In FIG. 6A, the secondary usage node $Sn_{1g}$ exists inside the area 12h. Further, the secondary usage node $Sn_{1h}$ exists inside the area 12g. Therefore, if the secondary usage node $Sn_{1g}$ and the secondary usage node $Sn_{1h}$ transmit beacons at the same time, the beacons are likely to collide with each other.

In such a positional relationship, it is assumed in the sequence chart of FIG. 6B that the secondary usage node $Sn_{1g}$ starts secondary usage prior to the secondary usage node $Sn_{1h}$. Referring to FIG. 6B, at the start of the second communication service, the secondary usage node $Sn_{1g}$ performs sensing of a primary signal in the first period (step S10). The secondary usage node $Sn_{1g}$ then achieves synchronization by sensing and determines a transmission power of a beacon.

Next, the secondary usage node $Sn_{1g}$ performs sensing of a secondary signal in the second period (step S12). Then, when the secondary usage node $Sn_{1g}$ confirms that a secondary signal is not transmitted from another secondary usage node, the secondary usage node $Sn_{1g}$ transmits a beacon for the second communication service inside the area 12g by using the transmission power determined in the step S10 in the third period (step S14).

On the other hand, it is assumed that the secondary usage node $Sn_{1h}$ is also about to start secondary usage when the beacon is transmitted from the secondary usage node $Sn_{1g}$. In this case, the secondary usage node $Sn_{1h}$ performs sensing of a primary signal in the first period (step S16) and then performs sensing of a secondary signal in the second period (step S18). At this time, when the secondary usage node $Sn_{1h}$ detects the beacon transmitted from the secondary usage node $Sn_{1g}$, the secondary usage node $Sn_{1h}$ stops transmission of its own beacon in the subsequent third period and waits for a given time (step S28). The given time may be a time period that is figured out from the end time of the super frame which is acquired by decoding the beacon transmitted from the secondary usage node $Sn_{1g}$ or the like, for example, as described above.

Note that, although not shown, when there is another candidate of channel available for secondary usage, the secondary usage node $Sn_{1h}$ may attempt to form a super frame on the channel instead of waiting for a given time in the step S28.

On the other hand, while the secondary usage node $Sn_{1h}$ is waiting, the secondary usage node $Sn_{2g}$ that has received the beacon from the secondary usage node $Sn_{1g}$ transmits a connection request to the secondary usage node $Sn_{1g}$ in the fourth period (step S20). Then, the secondary usage node $Sn_{1g}$ performs authentication and scheduling, and a connection permission (including scheduling information) is transmitted from the secondary usage node $Sn_{1g}$ to the secondary usage node $Sn_{2g}$ (step S22). After that, the secondary usage node $Sn_{2g}$ performs data communication by using the assigned slot in the fifth period (step S24).

Further, after the lapse of the given time, the secondary usage node $Sn_{1h}$ performs sensing of a primary signal in the first period (step S30) and then performs sensing of a secondary signal in the second period (step S32) again. Then, when the secondary usage node $Sn_{1h}$ confirms that a secondary signal is not transmitted from another secondary usage node, the secondary usage node $Sn_{1h}$ transmits a beacon for the second communication service inside the area 12h in the third period (step S34). After that, the secondary usage node $Sn_{2h}$ that has received the beacon from the secondary usage node $Sn_{1h}$ transmits a connection request to the secondary usage node $Sn_{1h}$ in the fourth period (step S36). The subsequent flow of communication is the same as the steps S20 to S24 and not repeatedly described.

(Second Scenario)

Figure 7A:
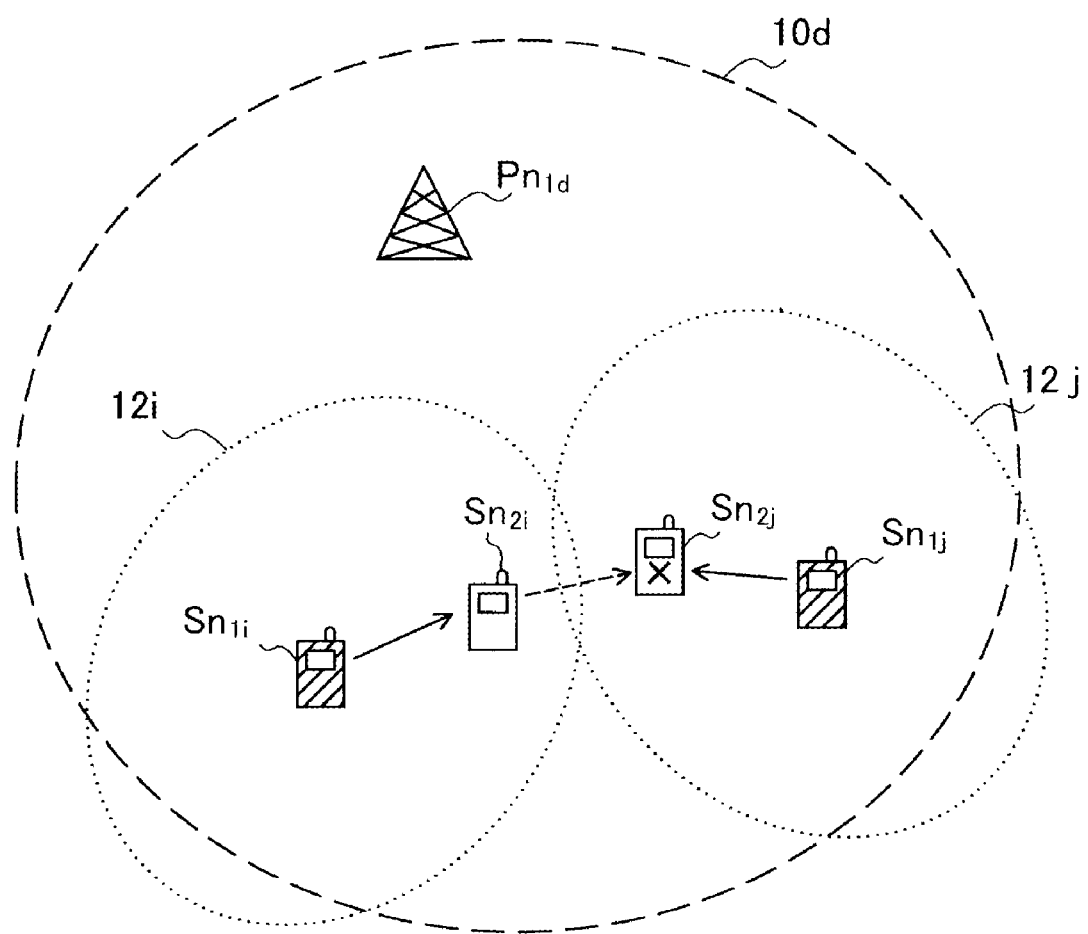
FIG. 7A is a diagram showing a positional relationship of secondary usage nodes in a second scenario related to collision of secondary signals.
Figure 7B:
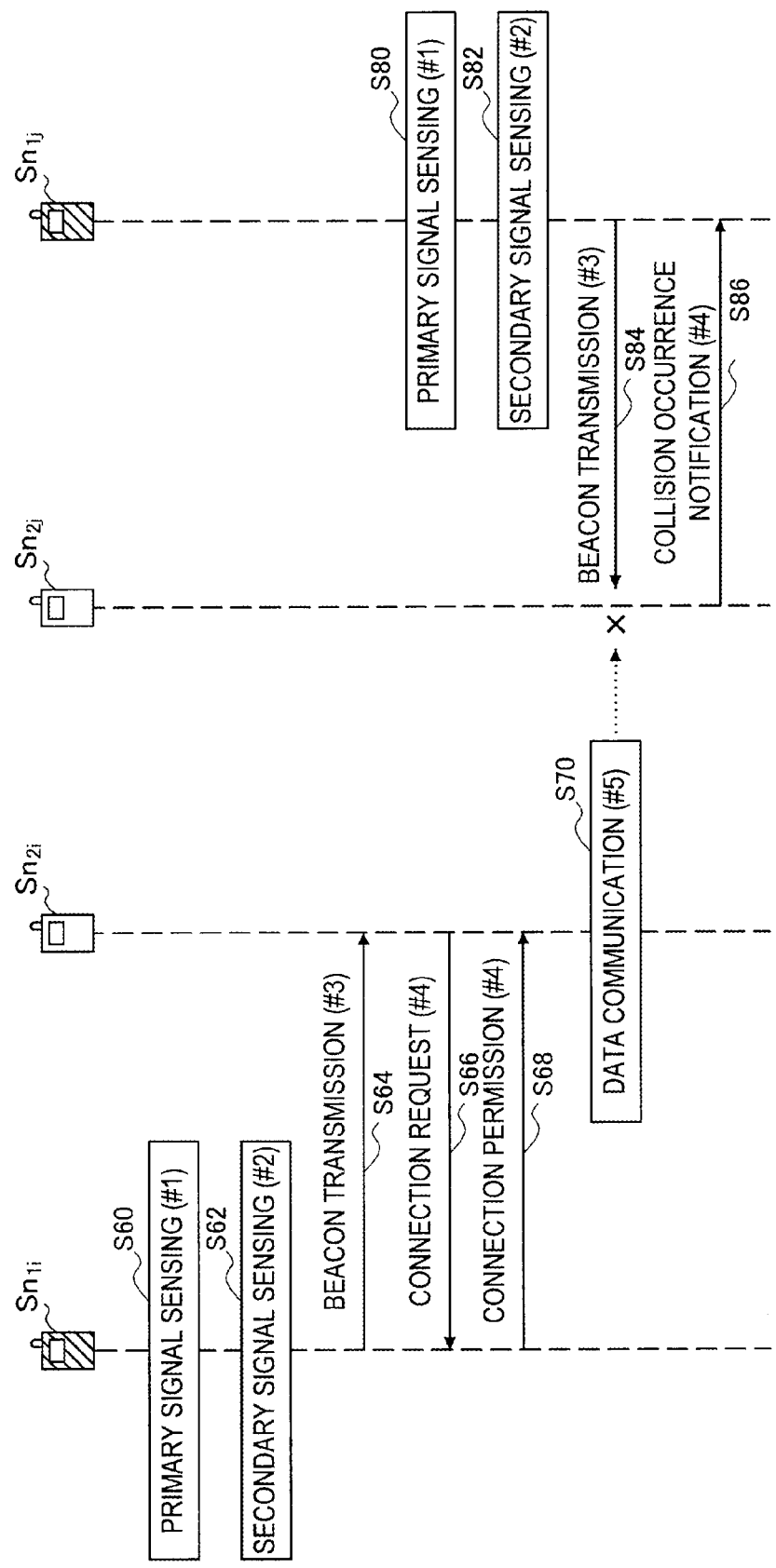
FIG. 7B is a sequence chart showing the second scenario related to collision of secondary signals.

FIGS. 7A and 7B are explanatory views to describe a second scenario in which collision of secondary signals occurs in the framework described above with reference to FIG. 4. FIG. 7A shows a positional relationship of secondary usage nodes in the second scenario. FIG. 7B is a sequence chart showing an example of a flow of communication according to the second scenario.

Referring to FIG. 7A, a base station $Pn_{1d}$ that provides the first communication service inside the cell 10d and secondary usage nodes $Sn_{1i}$, $Sn_{2i}$, $Sn_{1j}$, and $Sn_{2j}$ that make secondary usage of the spectrum assigned to the first communication service are shown. The secondary usage node $Sn_{1i}$ acts as a coordinator of the second communication service and transmits a beacon for the second communication service to a secondary usage node located inside the area 12i. The secondary usage node $Sn_{1j}$ also acts as a coordinator of the second communication service and transmits a beacon for the second communication service to a secondary usage node located inside the area 12j. In FIG. 7A, the secondary usage node $Sn_{2i}$ and the secondary usage node $Sn_{2j}$ are located in close proximity to each other. Therefore, if the secondary usage node $Sn_{2i}$ transmits a secondary signal, the secondary signal is likely to collide with another radio signal (e.g. a beacon from the secondary usage node $Sn_{1j}$) to be received by the secondary usage node $Sn_{2j}$.

In such a positional relationship, it is assumed in the sequence chart of FIG. 7B that the secondary usage node $Sn_{1i}$ starts secondary usage prior to the secondary usage node $Sn_{1j}$. Referring to FIG. 7B, at the start of the second communication service, the secondary usage node $Sn_{1i}$ performs sensing of a primary signal in the first period (step S60). The secondary usage node $Sn_{1i}$ then achieves synchronization by sensing and determines a transmission power of a beacon.

Next, the secondary usage node $Sn_{1i}$ performs sensing of a secondary signal in the second period (step S62). Then, when the secondary usage node $Sn_{1i}$ confirms that a secondary signal is not transmitted from another secondary usage node, the secondary usage node $Sn_{1i}$ transmits a beacon for the second communication service inside the area 12i by using the transmission power determined in the step S60 in the third period (step S64). Then, the secondary usage node $Sn_{2i}$ that has received the beacon from the secondary usage node $Sn_{1i}$ transmits a connection request to the secondary usage node $Sn_{1i}$ in the fourth period (step S66). Then, the secondary usage node $Sn_{1i}$ performs authentication and scheduling, and a connection permission (including scheduling information) is transmitted from the secondary usage node $Sn_{1i}$ to the secondary usage node $Sn_{2i}$ (step S68). After that, the secondary usage node $Sn_{2i}$ performs data communication by using the assigned slot in the fifth period (step S70).

On the other hand, it is assumed that the secondary usage nodes $Sn_{1j}$ and $Sn_{2j}$ are also about to start secondary usage while the secondary usage node $Sn_{2i}$ performs data communication. In this case, the secondary usage node $Sn_{1j}$ performs sensing of a primary signal in the first period (step S80) and then performs sensing of a secondary signal in the second period (step S82). Then, when the secondary usage node $Sn_{1j}$ confirms that a secondary signal is not transmitted from another secondary usage node, the secondary usage node $Sn_{1j}$ transmits a beacon for the second communication service inside the area 12j in the third period (step S84). At this time, if a data signal transmitted from the secondary usage node $Sn_{2i}$ and a beacon transmitted from the secondary usage node $Sn_{1j}$ reach the secondary usage node $Sn_{2j}$ at the same timing, collision of the two secondary signals occurs. Then, the secondary usage node $Sn_{2j}$ fails to normally receive the beacon transmitted from the secondary usage node $Sn_{1j}$. For example, the secondary usage node $Sn_{2j}$ may perform sensing and recognize the level of SINR in advance, and, when the beacon (or another secondary signal) is not receivable in spite of that SINR is a sufficient level, it can determine that collision of secondary signals is occurring.

In this case, the secondary usage node $Sn_{2j}$ notifies the secondary usage node $Sn_{1j}$ that collision of secondary signals is occurring in the fourth period (step S86). Then, the secondary usage node $Sn_{1j}$ performs an operation for avoiding collision such as excluding the secondary usage node $Sn_{2j}$ from the target of scheduling or switching a channel to another candidate of secondary usage channel Further, when the secondary usage node $Sn_{2j}$ fail to normally receive a beacon from any of the secondary usage node $Sn_{1j}$ and another coordinator, the secondary usage node $Sn_{2j}$ may sense an interference signal and determine that the interference signal is a signal from the secondary usage node $Sn_{2i}$ in the nearby vicinity. If the secondary usage node $Sn_{2j}$ determines that an interference signal is received from the nearby secondary usage node $Sn_{2i}$, the secondary usage node $Sn_{2j}$ may notify the existence of a nearby SUE that subscribes to another second communication service to the secondary usage node $Sn_{1j}$ when it obtains the opportunity of connection next time. In this case also, the secondary usage node $Sn_{1j}$ performs an operation for avoiding collision such as excluding the secondary usage node $Sn_{2j}$ from the target of scheduling or switching a channel to another candidate of secondary usage channel. Further, the secondary usage node $Sn_{1j}$ may monitor the number of times of retransmission of a secondary signal and determine that collision of secondary signals is occurring when the number of times of retransmission increases.

As described above, on the occasion of secondary usage of a spectrum, the secondary usage node that has a role of a coordinator controls the second communication service in a centric manner according to the framework shown in FIG. 4, and it is thereby possible to detect or avoid collision of signals depending on the surrounding communication conditions and suppress interference.

[1-8. Scope of Term "Secondary Usage"]

In this specification, the term "secondary usage" typically means utilization of an additional or alternative communication service (a second communication service) using a part or whole of a spectrum assigned to a first communication service as described above. In this context about the meaning of the term "secondary usage", the first communication service and the second communication service may be services of different types or the same type. The services of different types may be selected from services such as digital TV broadcasting service, satellite communication service, mobile communication service, wireless LAN access service, P2P (Peer To Peer) connection service and the like. On the other hand, services of the same type may contain, for example, a relationship between a service of macro-cell provided by a communication carrier and a service of femto-cell operated by users or MVNO (Mobile Virtual Network Operator). Additionally, services of the same type may contain, for example, a relationship between a service provided by a base station of a communication service according to WiMAX, LTE (Long Term Evolution), LTE-A (LTE-Advanced) or the like and a service provided by relay station (relay node) to cover a spectrum hole. Further, a second communication service may be a service utilizing a plurality of fragmentary frequency bands aggregated using spectrum aggregation technology. Furthermore, a second communication service may be a supplementary communication service provided by femto-cells, relay stations or small or medium sized base stations for smaller service area than normal sized base stations within a service area of a normal sized base station. The subject matter of each embodiment described in this specification is applicable to every type of mode of such secondary usages.

In the foregoing, the proposed interference control model and framework for secondary usage are described, and the main points of the relevant technical concerns are described sequentially. Based thereon, two embodiments of a communication control method for avoiding signal collision and suppressing interference on the occasion of secondary usage of a spectrum are described hereinbelow.

<2. First Embodiment>

[2-1. Overview of Communication System]

Figure 8:
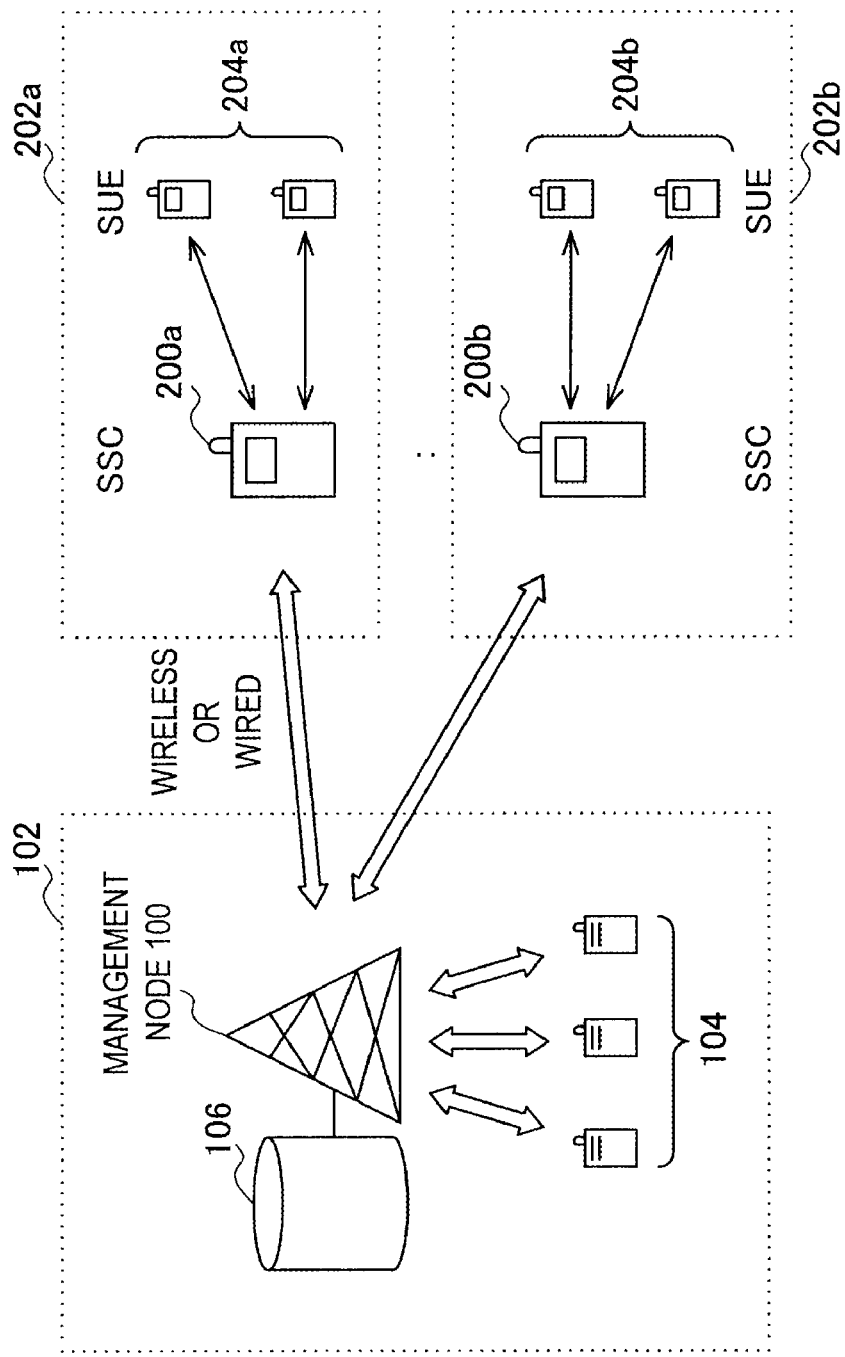
FIG. 8 is an explanatory view to describe an overview of a communication system according to a first embodiment.

FIG. 8 is an explanatory view to describe an overview of a communication system according to a first embodiment of the present invention.

FIG. 8 shows a primary system 102 that operates a first communication service and secondary systems 202a and 202b that respectively operate second communication services. The primary system 102 includes a management node 100 and a plurality of primary usage nodes 104.

The management node 100 is a primary usage node that has a role to manage secondary usage of the spectrum assigned to the first communication service. Although the management node 100 is a base station in the example of FIG. 8, the management node 100 is not limited thereto. Specifically, the management node 100 may be a primary usage node different from a base station, or it may be another node (e.g. a data server etc.) that is connected to a base station by wired or wireless means. In this embodiment, the management node 100 can gain access to a database 106 that stores location data indicating the locations of primary usage nodes included in the primary system 102.

The primary usage node 104 is a node that transmits and receives radio signals for the first communication service in the primary system 102. If the primary usage node 104 joins the primary system 102, location data indicating its location is registered into the database 106.

The database 106 is typically implemented as a geo-location database. In this embodiment, in response to a request from the management node 100, the database 106 outputs location data with respect to each primary usage node to the management node 100. Note that the database 106 may be integral with the management node 100 or it may be a separate unit from the management node 100.

On the other hand, the secondary system 202a includes a SSC 200a and a plurality of SUEs 204a. Likewise, the secondary system 202b includes a SSC 200b and a plurality of SUEs 204b.

The SSCs 200a and 200b are secondary usage nodes that have a role of a coordinator that controls the second communication service. Specifically, the SSCs 200a and 200b determine the availability of secondary usage according to a predetermined spectrum policy, receive allocation of a transmission power from the management node 100, and start the second communication service with the SUEs 204a or 204b. The SSCs 200a and 200b may operate as an engine for cognitive radio (CE: Cognitive Engine), for example.

The SUEs 204a and 204b are secondary usage nodes (or terminal devices, or UEs) that transmit and receive radio signals for the second communication service in the secondary systems 202a and 202b, respectively.

In the following description, when there is no particular need to distinguish between the SSCs 200a and 200b, they are referred to collectively as the SSC 200 by eliminating the alphabetical letter affixed to the reference numeral. The same applies to the secondary systems 202a and 202b (the secondary system 202) and the SUEs 204a and 204b (the SUE 204).
[2-2. Exemplary Configuration of Management Node]
(Description of Functional Blocks)

Figure 9:
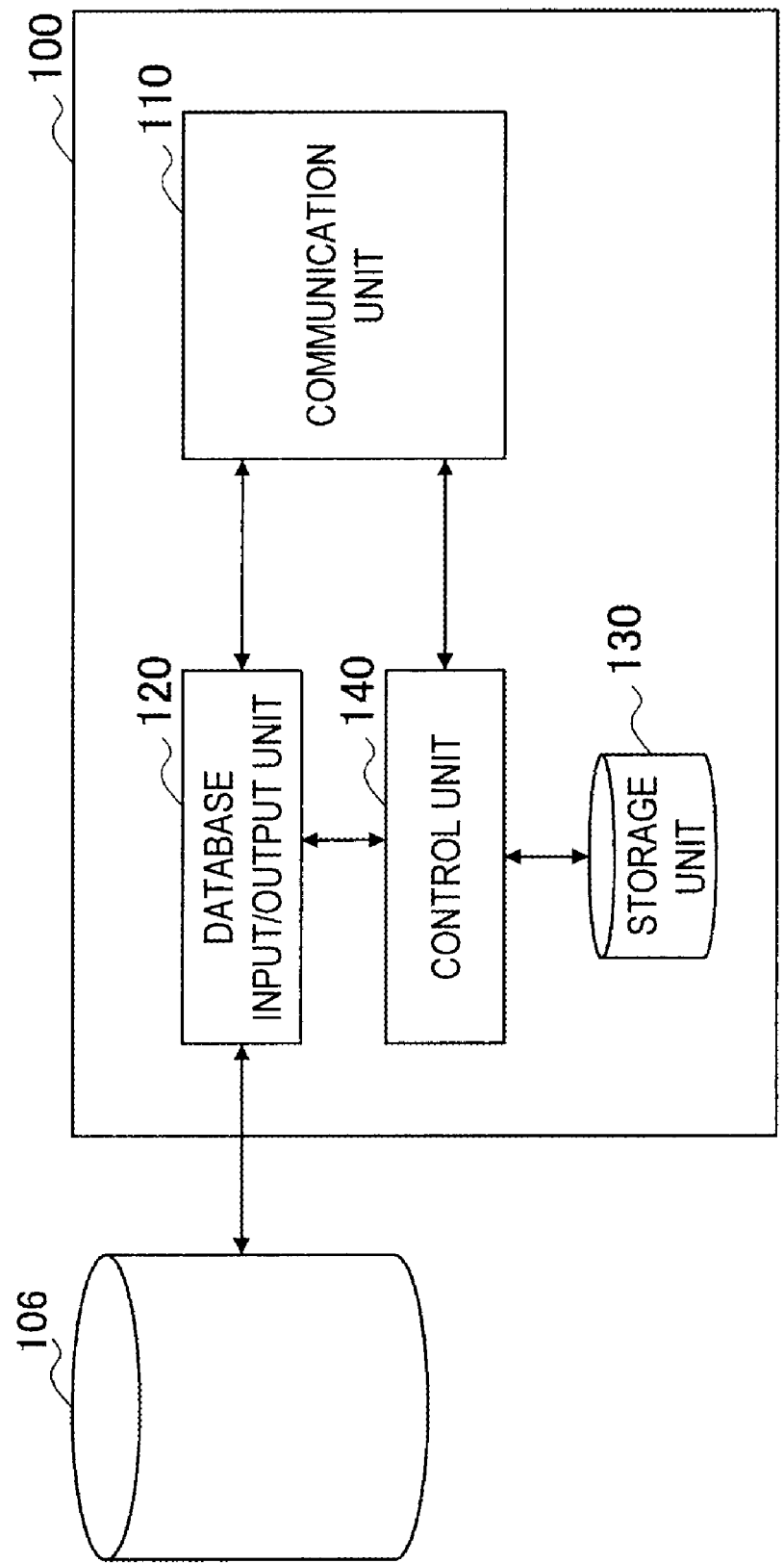
FIG. 9 is a block diagram showing an example of a logical configuration of a management node according to the first embodiment.

FIG. 9 is a block diagram showing an example of a logical configuration of the management node 100 shown in FIG. 8. Referring to FIG. 9, the management node 100 includes a communication unit 110, a database input/output unit 120, a storage unit 130 and a control unit 140.

The communication unit 110 transmits and receives radio signals to and from the primary usage nodes 104 by using a communication interface that can include an antenna, an RF circuit, a baseband circuit or the like in accordance with a given communication scheme of the first communication service. Further, the communication unit 110 receives location data of the SSC 200 from the SSC 200 and outputs the received location data to the control unit 140 as described in further detail later.

The database input/output unit 120 mediates the access from the control unit 140 to the database 106. Specifically, in response to a request from the control unit 140, the database input/output unit 120 acquires location data indicating the location of the primary usage node 104 from the database 106, and outputs the acquired location data to the control unit 140. Further, if the database input/output unit 120 receives location data from the primary usage node 104 that newly joins the primary system 102 through the communication unit 110, it registers the location data into the database 106. Further, the database input/output unit 120 may acquire the location data stored in the database 106 in response to an inquiry from an external device and output the acquired location data.

The storage unit 130 stores programs and data to be used for the operation of each unit of the management node 100 by using a recording medium such as hard disk or semiconductor memory, for example. Further, in this embodiment, the storage unit 130 stores various parameters necessary for calculation of the transmission power according to the above-described interference control model. The parameters stored in the storage unit 130 may include a parameter related to the quality of radio signals required in the first communication service (e.g. a required radio signal reception level and a signal to interference and noise ratio) and a parameter related to the interference or noise level in the first communication service. Note that the values of those parameters may be updated dynamically. For example, the value of the required quality of radio signals can be updated dynamically according to the type of an application to be provided to the primary usage node. Further, for example, the value of the interference or noise level can be updated dynamically by sensing through the communication unit 110.

The control unit 140 controls the overall functions of the management node 100 by using a control device such as a CPU (Central Processing Unit), for example. Further, in this embodiment, when the SSC 200 makes secondary usage of the spectrum assigned to the first communication service, the control unit 140 determines the acceptable transmission power for the second communication service according to the above-described interference control model. A transmission power determination process that is performed by the control unit 140 is described in further detail later. Further, when there are two or more second communication services, the control unit 140 distributes the determined transmission power to the two or more second communication services. A transmission power distribution process that is performed by the control unit 140 is described in further detail later. The control unit 140 then notifies the determined or distributed transmission power value to each SSC 200 through the communication unit 110.

(Flow of Transmission Power Determination Process)

Figure 10:
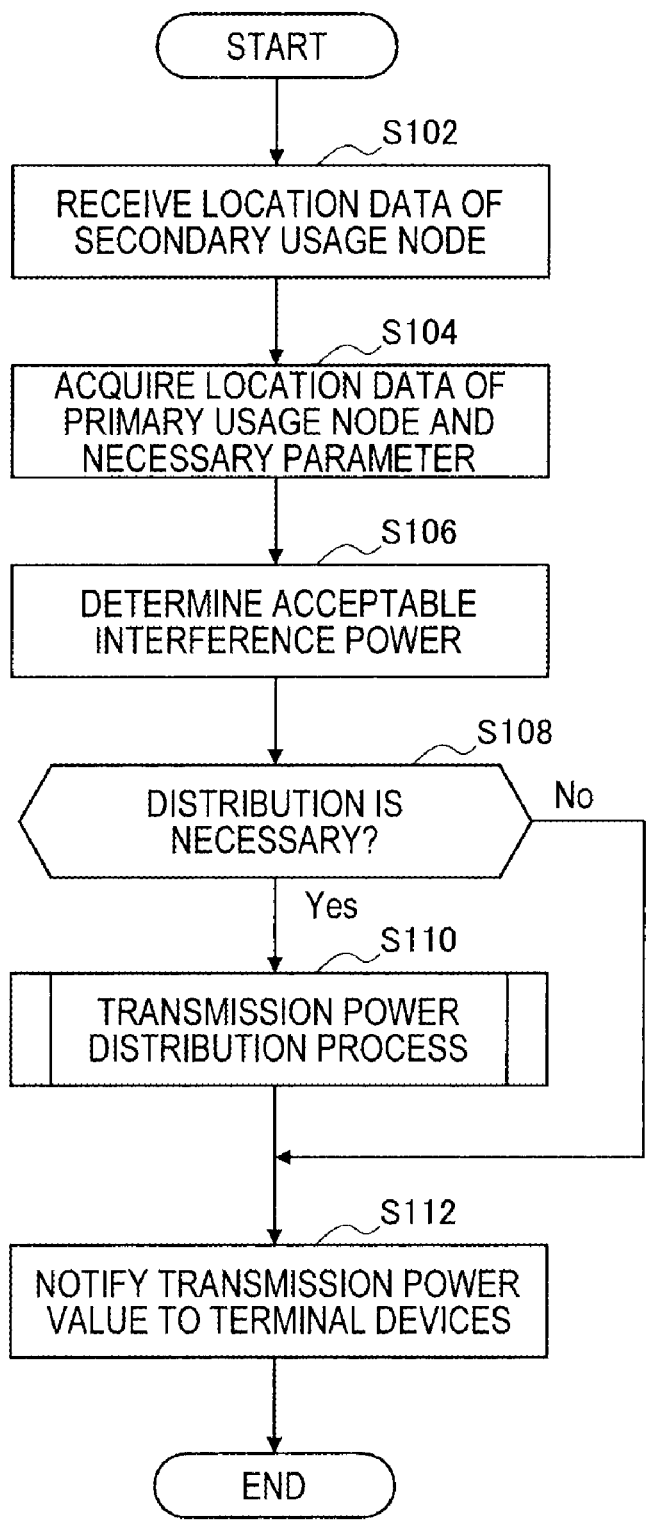
FIG. 10 is a flowchart showing an example of a flow of a transmission power determination process according to the first embodiment.

FIG. 10 is a flowchart showing an example of a flow of a transmission power determination process that determines the acceptable transmission power for the second communication service by the control unit 140 of the management node 100.

Referring to FIG. 10, the control unit 140 first receives location data of the SSC 200 from the SSC 200 through the communication unit 110 (step S102). In this specification, the location data may include values of latitude and longitude measured by using the GPS functions, coordinate values with a point of origin at a given control point measured by applying the direction of arrival estimation algorithm or the like, for example. Further, the control unit 140 may receive not only location data of the SSC 200 but also location data of each SUE 204 from the SSC 200.

Next, the control unit 140 acquires location data of the primary usage node from the database 106 through the database input/output unit 120. Further, the control unit 140 acquires necessary parameters from the storage unit 130 (step S104). Note that, in the case where secondary usage is made on the uplink channel of the OFDMA system as in the example shown in FIG. 2A, the interfered node is the base station only. In such a case, the control unit 140 acquires only the location data of the management node 100, which is the base station, as the location data of the primary usage node. Further, the necessary parameters in the step S104 correspond to the quality of radio signals required in the first communication service, the interference or noise level in the first communication service (or a parameter for calculating those levels) or the like, for example.

Then, the control unit 140 determines the acceptable interference power of the second communication service based on the location data and the parameters that are received in the step S102 and acquired in the step S104, respectively (step S106). Specifically, the control unit 140 can determine the acceptable interference power of the second communication service according to the expression (9) in the above-described interference control model, for example. For example, the quality of radio signals required in the first communication service corresponds to the term $P_{rx\_primary,primary}/SINR_{required}$ in the expression (9). Further, the interference or noise level corresponds to the term $N_{primary}$ in the expression (9). Furthermore, the value of the path loss $L_{path\_tx\_secondary,i}$ in the expression (9) can be calculated according to the expression (6) by using the distance d that is derived from the location data of the primary usage node and the location data of each SSC 200. Note that the control unit 140 may receive the value of each path loss $L_{path\_tx\_secondary,i}$ from the respective SSCs 200 in the step S102 instead of calculating the value of each path loss $L_{path\_tx\_secondary,i}$ from the location data, for example. The value of the path loss $L_{path\_tx\_secondary,i}$ can be calculated as a difference between the transmission power value of a downlink signal from the base station and the reception level of the downlink signal in each SSC 200.

Then, the control unit 140 determines whether it is necessary to distribute the value of the transmission power (step S108). For example, in the case where secondary usage is made by two or more SSCs 200 as illustrated in FIG. 8, the control unit 140 determines that it is necessary to distribute the value of the transmission power among the two or more SSCs 200. In this case, the process proceeds to the step S110 and the control unit 140 performs a transmission power distribution process (step S110). On the other hand, in the case where there is only one SSC 200 that makes secondary usage and it is not necessary to distribute the value of the transmission power, the step S110 can be skipped.

After that, the control unit 140 notifies the value of the determined or distributed transmission power to each SSC 200 through the communication unit 110 (step S112). Note that the control unit 140 may notify additional information such as a policy (e.g. a transmission spectrum mask, a modulation method etc.) to be complied with by the secondary usage node when making secondary usage of a spectrum, in addition to the value of the transmission power, to each SSC 200. After that, the second communication service can be started between the SSC 200 and each SUE 204.

(Flow of Transmission Power Distribution Process)

Figure 11:
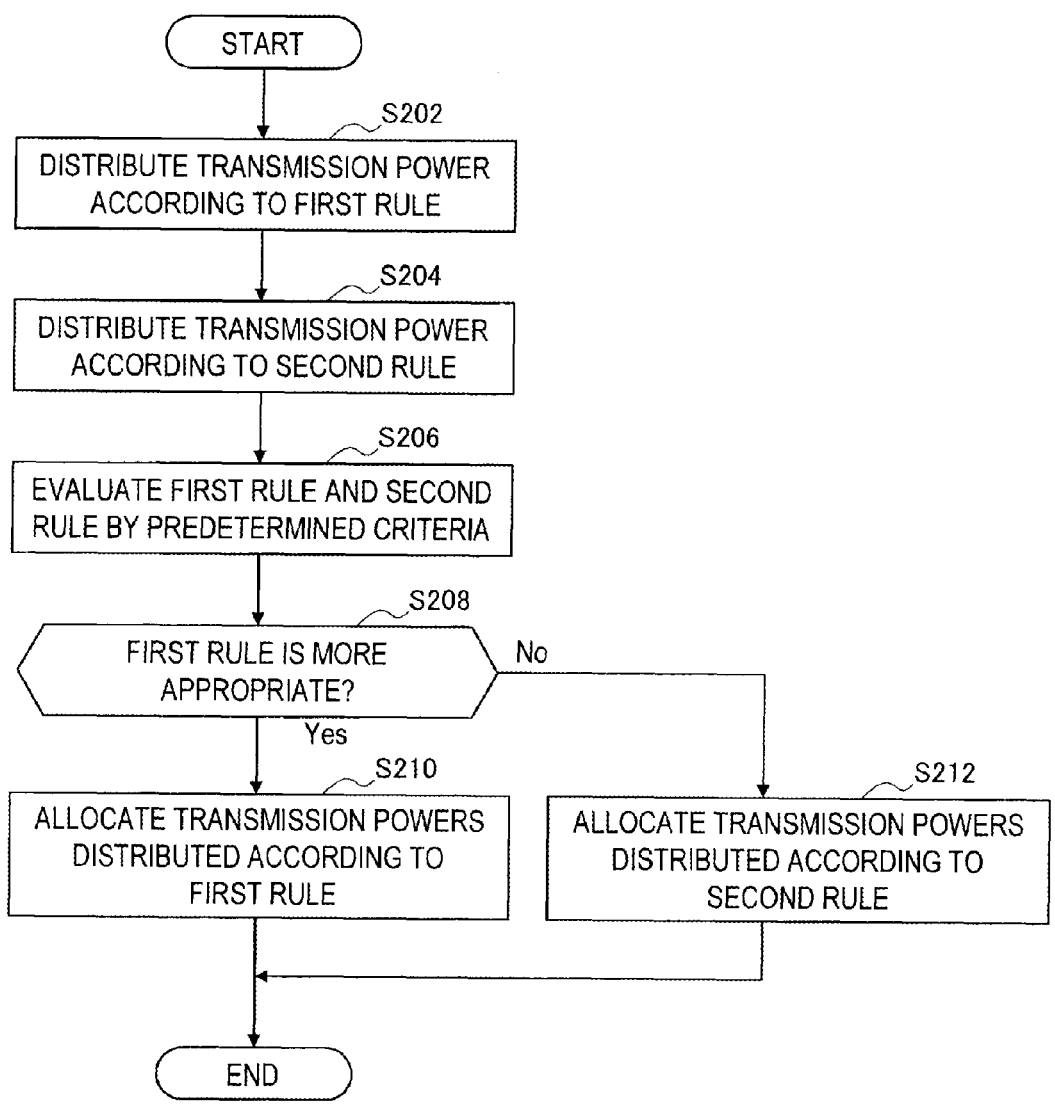
FIG. 11 is a flowchart showing an example of a flow of a transmission power distribution process according to the first embodiment.

FIG. 11 is a flowchart showing an example of a flow of a transmission power distribution process by the control unit 140 of the management node 100 in the case where two or more SSCs 200 exist, namely, where two or more second communication services are operated in the same cell.

Referring to FIG. 11, the control unit 140 first distributes the transmission power (the acceptable transmission power) depending on the acceptable interference power that is determined in the step S106 of FIG. 10 according to the first rule (step S202). Next, the control unit 140 distributes the transmission power depending on the interference power which is the same as in the step S202 according to the second rule (step S204). The first rule and the second rule may be the above-described equal type transmission power distribution rule and the unequal type transmission power distribution rule, respectively, for example.

Then, the control unit 140 evaluates the transmission power distributed according to the first rule and the transmission power distributed according to the second rule by predetermined evaluation criteria (step S206). The predetermined evaluation criteria may be the total capacity that is provided to all SSCs 200 in the end, for example. In this case, the total capacity C can be evaluated according to the following expression.

$$C = \sum_{i=1}^{n} C_i = \sum_{i=1}^{n} \left( \log_2 \left( 1 + \frac{P_{tx\_secondary,i}}{N_i} \right) \right) \quad \text{Expression (13)}$$

In the above expression, $P_{tx\_secondary,i}$ indicates the transmission power distributed to the i-th SSC 200, and $N_i$ indicates the noise level of the i-th SSC 200.

Further, in the expression (13), the control unit 140 may count only the SSCs 200 with a high priority, out of the n-number of SSCs 200, for calculating the total capacity. The priority can be assigned depending on the type, contents or the like of the second communication service, for example. For example, a high priority can be assigned to the service for which small delay is needed, such as motion picture delivery or network game, for example. Further, a high priority can be assigned to the service to which high service charge is set so as to ensure a certain service quality. Then, the priority can be received together with the location data of the SSC 200 in the step S102 of FIG. 10, for example.

Further, the control unit 140 may evaluate the total number of links of the second communication services that can be established by using the distributed transmission powers in the step S206 instead of evaluating the capacity as in the expression (13). In this case, the control unit 140 first determines whether each pair of secondary usage nodes which desire for communication can establish communication according to the transmission powers distributed to the respective SSCs 200. Then, the number of links determined that communication can be established is counted as the total number of links of the second communication services.

Then, the control unit 140 determines which of the first rule and the second rule is more appropriate by comparing the capacity or the total number of links evaluated in the step S206 (step S208). For example, when the transmission powers distributed according to the first rule can achieve the larger capacity than the transmission powers distributed according to the second rule, the control unit 140 can determine that the first rule is more appropriate. Further, when the transmission powers distributed according to the second rule can achieve the larger capacity than the transmission powers distributed according to the first rule, the control unit 140 can determine that the second rule is more appropriate. When it is determined that the first rule is more appropriate, the process proceeds to the step S210. On the other hand, when it is determined that the second rule is more appropriate, the process proceeds to the step S212.

In the step S210, the transmission powers distributed according to the first rule that is determined to be more appropriate are allocated to the respective SSCs 200 (step S210). On the other hand, in the step S212, the transmission powers distributed according to the second rule that is determined to be more appropriate are allocated to the respective SSCs 200 (step S212). After that, the transmission power distribution process shown in FIG. 11 ends.

Note that the case where the first rule and the second rule that can respectively correspond to the equal type and the unequal type are evaluated in terms of the capacity or the number of links that can be established is particularly described above. However, it is not limited thereto, and the transmission power distribution rules other than the equal type and the unequal type may be adopted. Further, three or more transmission power distribution rules may be evaluated.

[2-3. Exemplary Configuration of Secondary Usage Node (SSC)]

(Description of Functional Blocks)

Figure 12:
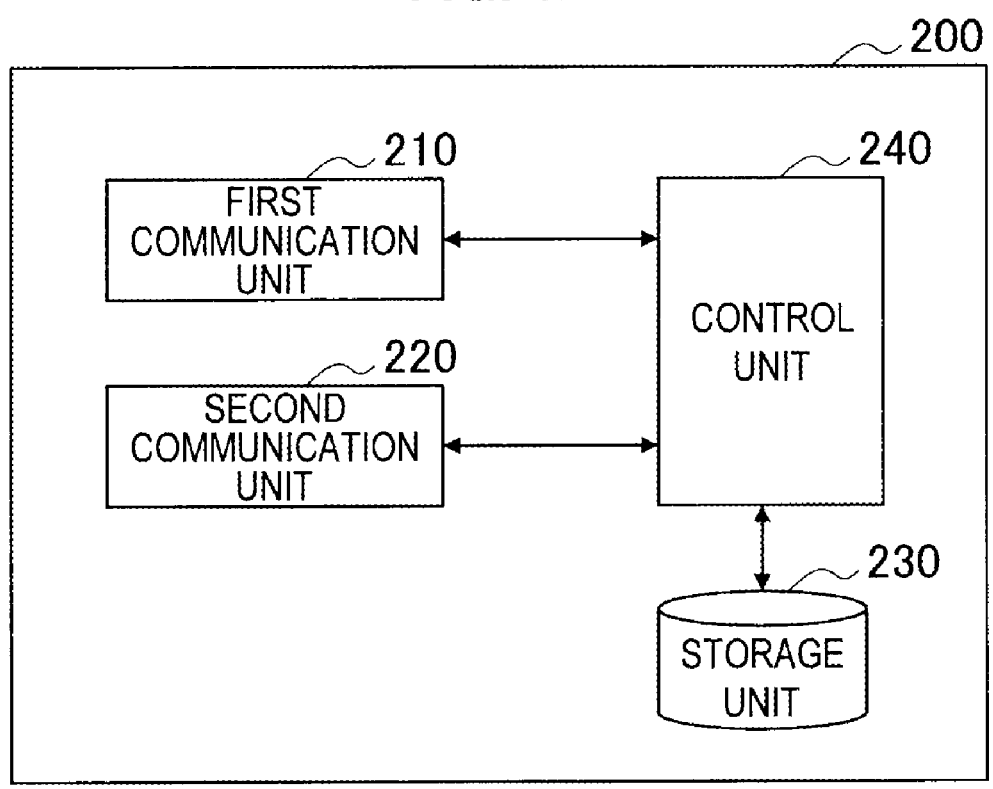
FIG. 12 is a block diagram showing an example of a logical configuration of a secondary usage node (SSC) according to the first embodiment.

FIG. 12 is a block diagram showing an example of a logical configuration of the SSC 200 shown in FIG. 8. Referring to FIG. 12, the SSC 200 includes a first communication unit 210, a second communication unit 220, a storage unit 230 and a control unit 240. In this embodiment, the SSC 200 can communicate with the management node 100 through the first communication unit 210 and also transmit and receive radio signals for the second communication service through the second communication unit 220.

The first communication unit 210 communicates with the management node 100 in accordance with a given communication scheme. A channel used for communication between the first communication unit 210 and the management node 100 may be a cognitive pilot channel (CPC), which is a control channel, for example. The CPC may include an inbound CPC in which CPC information is extrapolated in an existing communication system (e.g. the primary system 102) or an outbound CPC which is a dedicated channel in which CPC information is interpolated, for example.

For example, the first communication unit 210 transmits location data indicating the location of its own equipment to the management node 100 in response to an instruction (an instruction operation by a user or a request from another node) for start of secondary usage of a spectrum or the like. The location data indicating the location of its own equipment may be data measured by using GPS (Global Positioning System) function, for example. After that, the first communication unit 210 receives the value of the acceptable transmission power which is determined according to the above-described technique from the management node 100 and outputs it to the control unit 240. Further, the first communication unit 210 receives the location data of an interfered node that receives interference when the secondary usage is started from the management node 100 and outputs it to the control unit 240. Note that, in this embodiment, the interfered node that receives interference when the secondary usage is started corresponds to the management node 100, which is a base station of the primary system 102.

The second communication unit 220 transmits and receives radio signals to and from the SUE 204 in accordance with a given communication scheme. For example, the second communication unit 220 first performs sensing of radio signals of the first communication service and achieves synchronization of the uplink channel. Then, the second communication unit 220 transmits a beacon to the SUEs 204 in the nearby vicinity on a regular basis by using the synchronized uplink channel. The transmission power used by the second communication unit 220 is limited to the range that does not cause substantial interference on the primary usage node under control of the control unit 240. Further, the beacon that is transmitted to the SUEs 204 in the nearby vicinity includes the value of the acceptable interference power received by the first communication unit 210, and the location data of the interfered node and the SSC 200. The value of the acceptable interference power and the respective location data are used for the transmission power control process by the SUE 204 as described later.

Note that, when the communication link between the first communication unit 210 and the management node 100 is a radio link, the first communication unit 210 and the second communication unit 220 may share the physically identical communication interface that can include an antenna, an RF circuit, a baseband circuit or the like. The communication link between the first communication unit 210 and the management node 100 is called a backhaul link in some cases.

The storage unit 230 stores programs and data to be used for the operation of each unit of the SSC 200 by using a recording medium such as hard disk or semiconductor memory, for example. Further, in this embodiment, the storage unit 230 stores various parameters for operation of the second communication service and control of the transmission power. The parameters stored in the storage unit 230 may include the location data of its own equipment (and other secondary usage nodes that subscribe to the second communication service according to need), the acceptable transmission power notified from the management node 100, a spectrum mask, a modulation method or the like, for example.

The control unit 240 controls the overall functions of the SSC 200 by using a control device such as a CPU, for example. For example, in this embodiment, the control unit 240 controls the value of the transmission power used for transmission of radio signals by the second communication unit 220 within the range of the acceptable transmission power notified from the management node 100. Then, the control unit 240 controls the second communication unit 220 to transmit the beacon including the acceptable interference power and each location data described above. Further, when the control unit 240 receives a connection request for the second communication service from the SUE 204 that has received the beacon, the control unit 240 performs authentication of the connection request, scheduling (slot assignment) by the SUE 204 or the like.

(Flow of Secondary Usage Start Process)

Figure 13:
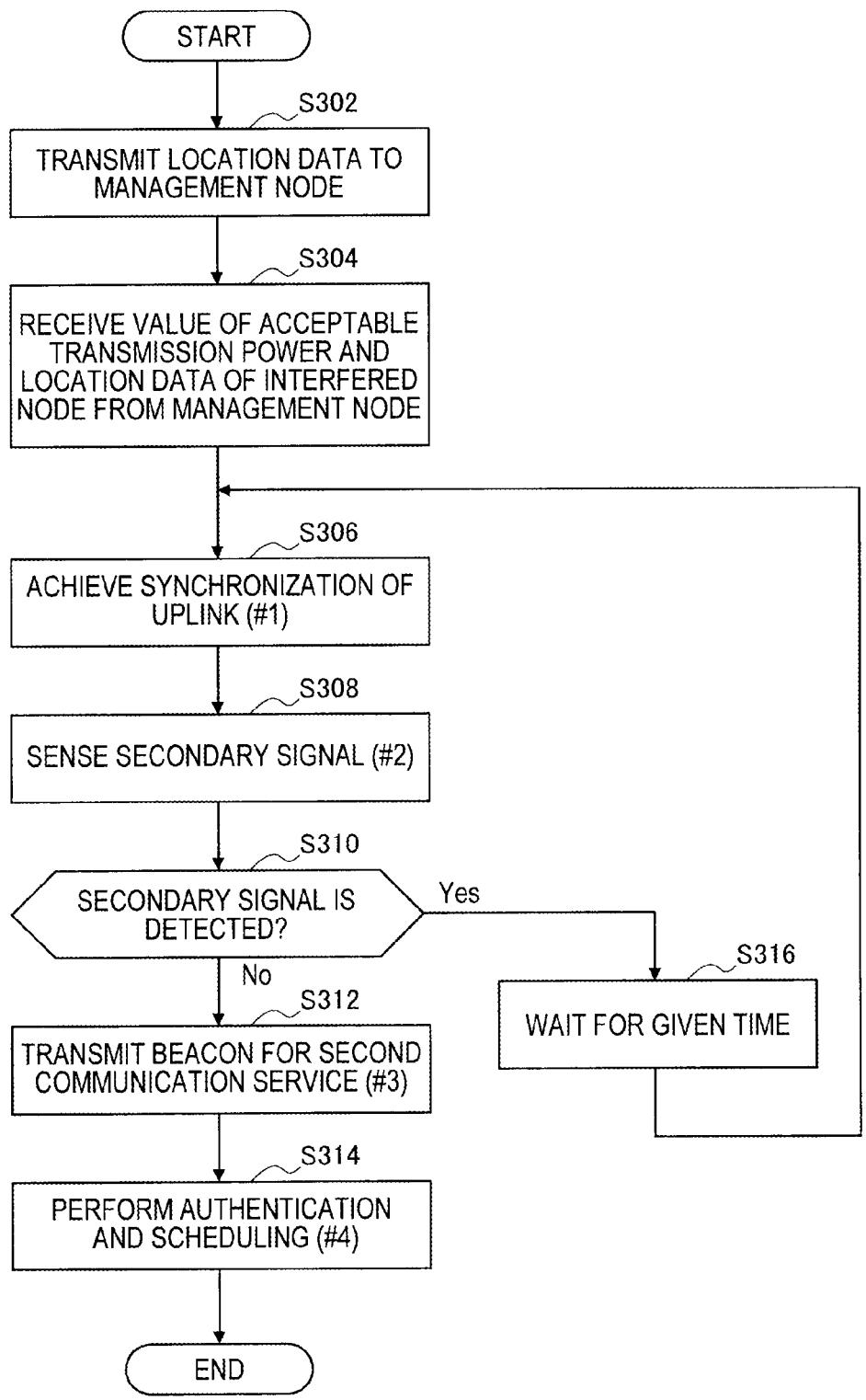
FIG. 13 is a flowchart showing an example of a flow of a secondary usage start process by the secondary usage node (SSC) according to the first embodiment.

FIG. 13 is a flowchart showing an example of a flow of a secondary usage start process by the SSC 200.

Referring to FIG. 13, upon detection of an instruction for start of secondary usage, for example, the first communication unit 210 transmits the location data of the SSC 200 to the management node 100 (step S302). In this step, not only the location data of the SSC 200 but also the location data of other SUEs 204 may be transmitted to the management node 100.

Next, the first communication unit 210 receives the value of the acceptable transmission power which is determined according to the above-described interference control model and the location data of the management node 100, which is an assumed interfered node, from the management node 100 (step S304). Further, additional information such as a transmission spectrum mask or a modulation method may be received in addition to the acceptable transmission power, for example.

Then, the control unit 240 performs sensing of a primary signal in the primary sensing period and achieves synchronization of the uplink channel of the first communication service (step S306). Further, the control unit 240 performs sensing of a secondary signal in the secondary sensing period and checks whether a secondary signal is transmitted from a communication device in the nearby vicinity (step S308). When a secondary signal from a nearby communication device is detected, the process proceeds to the step S316. On the other hand, when a secondary signal from a nearby communication device is not detected, the process proceeds to the step S312 (step S310).

In the step S312, the control unit 240 controls the second communication unit 220 to transmit a beacon for the second communication service in the control frame transmission period by using a transmission power within the range of the acceptable transmission power received in the step S304 (step S312). The beacon includes the value of the acceptable transmission power allocated to the second communication service and the location data of the interfered node and the SSC 200.

Then, when the control unit 240 receives a connection request to the second communication service from the SUE 204 through the second communication unit 220, the control unit 240 authenticates the connection request and performs scheduling of the SUE 204 in the connection and scheduling period (step S314). The SUE 204 can thereby perform data communication by the second communication service in the data communication period. At this time, the SUE 204 controls the transmission power to be used for transmission of radio signals for the second communication service based on the value of the acceptable transmission power and each location data included in the beacon transmitted from the SSC 200 in the step S312. The transmission power control process by the SUE 204 is described in further detail later.

On the other hand, in the step S316, the control unit 240 waits for a given time in order to avoid collision of a secondary signal transmitted from another communication device and a beacon transmitted from itself (step S316). After that, the process returns to the step S306.

By the above secondary usage start process, the SSC 200 can suppress the transmission power of a beacon transmitted from itself and a secondary signal transmitted from a SUE to the range that does not cause substantial interference on the primary system and avoid collision of secondary signals.

[2-4. Exemplary Configuration of Secondary Usage Node (SUE)]

As described above, in this embodiment, the SUE 204 receives a beacon for the second communication service from the SSC 200. Then, the SUE 204 controls the transmission power of a connection request transmitted in the connection and scheduling period and a data signal transmitted in the data communication period based on the location data of the SSC 200 and the interfered node or the like included in the received beacon. In this section, an overview of transmission power control by the SUE 204 based on the above-described location data is described hereinafter with reference to FIG. 14A.

Figure 14A:
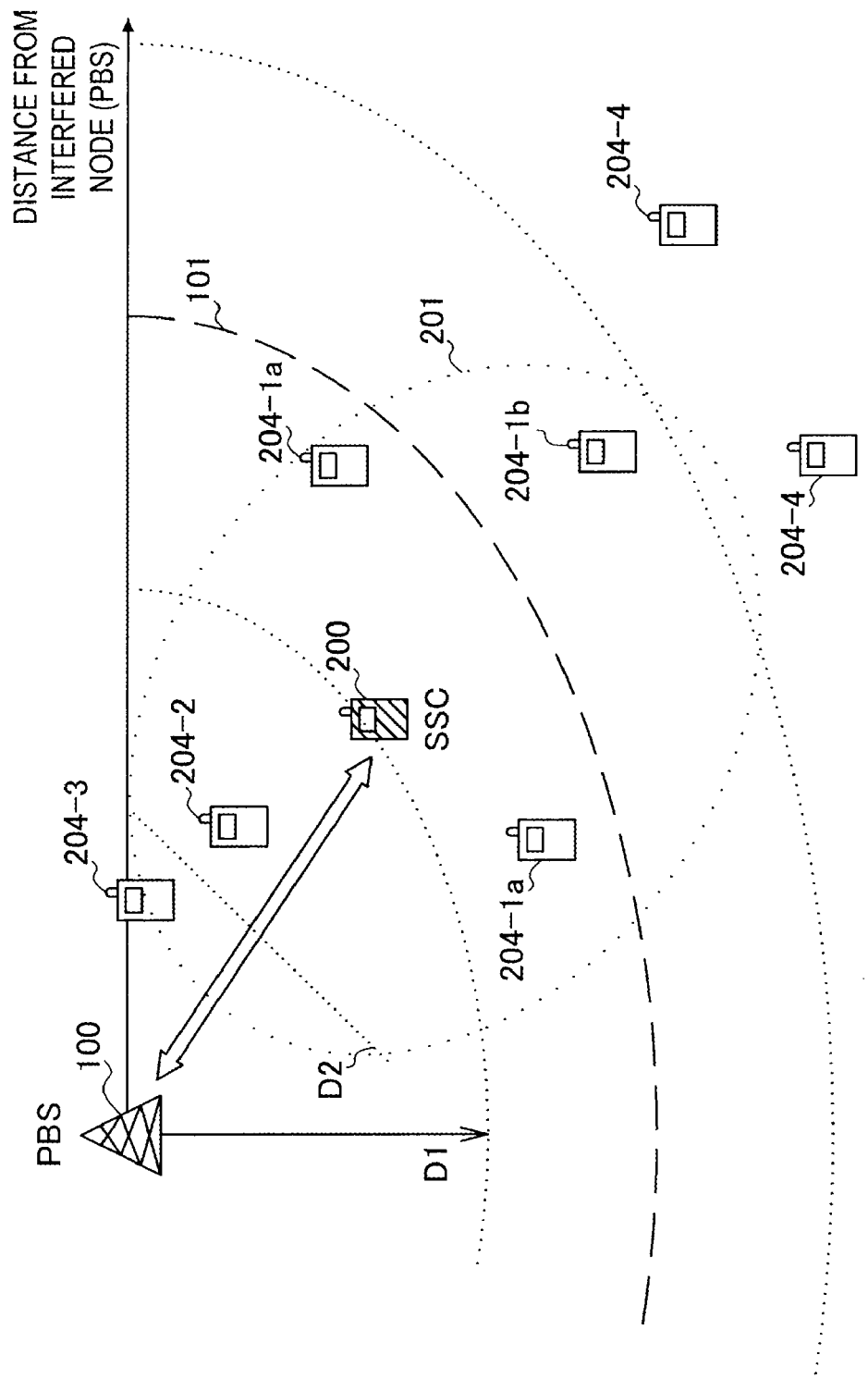
FIG. 14A is an explanatory view to describe an overview of transmission power control based on locations of secondary usage nodes (SUE).

FIG. 14A is an explanatory view to describe an overview of transmission power control based on the locations of the secondary usage nodes (SUEs). FIG. 14B is an explanatory view to describe the classification of the locations of the secondary usage nodes (SUEs).

The management node 100 (which is mainly referred to as the base station 100 when focusing on the aspect of being an interfered node) that receives interference by the second communication service in this embodiment is shown at the upper left of FIG. 14A. The base station 100 provides the first communication service in the cell within the boundary 101, which is partly shown. The SSC 200 which serves as a coordinator of the second communication service is also shown in FIG. 14A. The SSC 200 has a distance D1 away from the management node 100. The SSC 200 transmits a beacon for the second communication service that can be received within the range surrounded by the boundary 201 by using a transmission power which does not exceed the acceptable transmission power that is determined according to the above-described interference control model.

Further, a plurality of SUEs 204 (204-1 to 204-4) are shown in FIG. 14A. The SUEs 204 are classified into four types (Types 1 to 4) depending on the positional relationship with the base station 100 and the SSC 200.

(Type 1)

The SUE that is classified as Type 1 is located in a region where the distance from the interfered node (i.e. the base station 100) to the SUE is longer than the distance from the interfered node to a transmission source node of a beacon (i.e. the SSC 200), and where the beacon is receivable. For example, in FIG. 14A, the distance between the base station 100 and the SSC 200 is D1. Further, the location where the beacon transmitted from the SSC 200 is receivable is inside the boundary 201. Thus, the SUE 204 that is located in a diagonally shaded region R1 in FIG. 14B is classified as Type 1.

Specifically, the SUEs 204-1*a* and 204-1*b* shown in FIG. 14A (which are collectively referred to as the SUE 204-1) are classified as Type 1. Because the SUE 204-1 is located farther from the base station 100 compared to the SSC 200, the SUE 204-1 can transmit a secondary signal without causing interference on the base station 100 by using a transmission power equal to the transmission power of the beacon from the SSC 200. Further, the SUE 204-1 may operate as a gateway that relays secondary signals by ad-hoc communication to a UE that is unable to receive the beacon from the SSC 200, for example.

(Type 2)

The SUEs that are classified as Types 2 and 3 are also located in a region where the beacon is receivable. The SUE that is classified as Type 2 is located in a region where the distance from the interfered node to the SUE is shorter than the distance from the interfered node to the transmission source node of a beacon, and the distance from the interfered node to the SUE is longer than the distance from the SUE to the transmission source node of a beacon. For example, in FIG. 14A, the distance between the base station 100 and the SSC 200 is D1. Further, the dotted line D2 is a line indicating the position at which the distance to the base station 100 and the distance to the SSC 200 are equal. Thus, the SUE 204 that is located in a dotted region R2 in FIG. 14B is classified as Type 2.

Specifically, the SUE 204-2 shown in FIG. 14A is classified as Type 2. If the SUE 204-2 uses a transmission power equal to the transmission power of the beacon from the SSC 200, there is a possibility that gives interference at an unacceptable level to the base station 100. However, by using an appropriate transmission power which is lower than the transmission power of the beacon, the SUE 204-2 can transmit a secondary signal without causing interference on the base station 100. Further, the SUE 204-2 may operate as a gateway that relays secondary signals by ad-hoc communication to a UE located closer to the base station 100, for example.

(Type 3)

The SUE that is classified as Type 3 is located in a region where the distance from the interfered node to the SUE is shorter than the distance from the interfered node to the transmission source node of a beacon, and the distance from the interfered node to the SUE is shorter than the distance from the SUE to the transmission source node of a beacon. Thus, the SUE 204 that is located in a horizontally shaded region R3 in FIG. 14B is classified as Type 3.

Specifically, the SUE 204-3 shown in FIG. 14A is classified as Type 3. If the SUE 204-3 directly transmits a secondary signal to the SSC 200, there is a possibility that gives interference at an unacceptable level to the base station 100. Therefore, even if the SUE 204-3 can receive a beacon from the SSC 200, it is preferred not to directly respond to the beacon. Thus, the SUE 204-3 waits to transmit a response to the beacon until another node (e.g. the SUE 204-2 shown in FIG. 14A) located between the SSC 200 and the SUE 204-3 is detected. Then, when the SUE 204-3 receives a beacon for relay which is transmitted from the SUE 204-2, for example, the SUE 204-3 transmits a response to the beacon for relay by using a low transmission power which can be received only by the SUE 204-2. Then, the SUE 204-2 relays the response from the SUE 204-3 to the SSC 200, so that the SUE 204-3 can also subscribe to the second communication service. Note that the beacon for relay from the SUE 204-2 may be transmitted by using a low transmission power which does not cause interference on the interfered node by ad-hoc communication for relaying secondary signals, for example.

(Type 4)

The SUE that is classified as Type 4 is located in a region where the beacon is not receivable. Specifically, the SUE 204-4 shown in FIG. 14A is classified as Type 4. Because the SUE 204-4 fails to receive a beacon from the SSC 200, the SUE 204-4 is unable to directly subscribe to the second communication service. Thus, the SUE 204-4 waits until another node (e.g. the SUE 204-1*b* shown in FIG. 14A) to relay secondary signals is detected. Then, when the SUE 204-4 receives a beacon for relay which is transmitted from the SUE 204-1*b*, for example, the SUE 204-4 transmits a response to the beacon for relay. Then, the SUE 204-1*b* relays the response from the SUE 204-4 to the SSC 200, so that the SUE 204-4 can also subscribe to the second communication service. Note that the beacon for relay from the SUE 204-1*b* may be also transmitted by using a low transmission power which does not cause interference on the interfered node by ad-hoc communication for relaying secondary signals, for example.

As described above, the SUEs 204 control a transmission power depending on the positional relationships with the base station 100 and the SSC 200 which are typically classified into four types, and it is thereby possible to safely transmit a connection request or a data signal for the second communication service without causing interference on the base station 100.

(Description of Functional Blocks)

Figure 15:
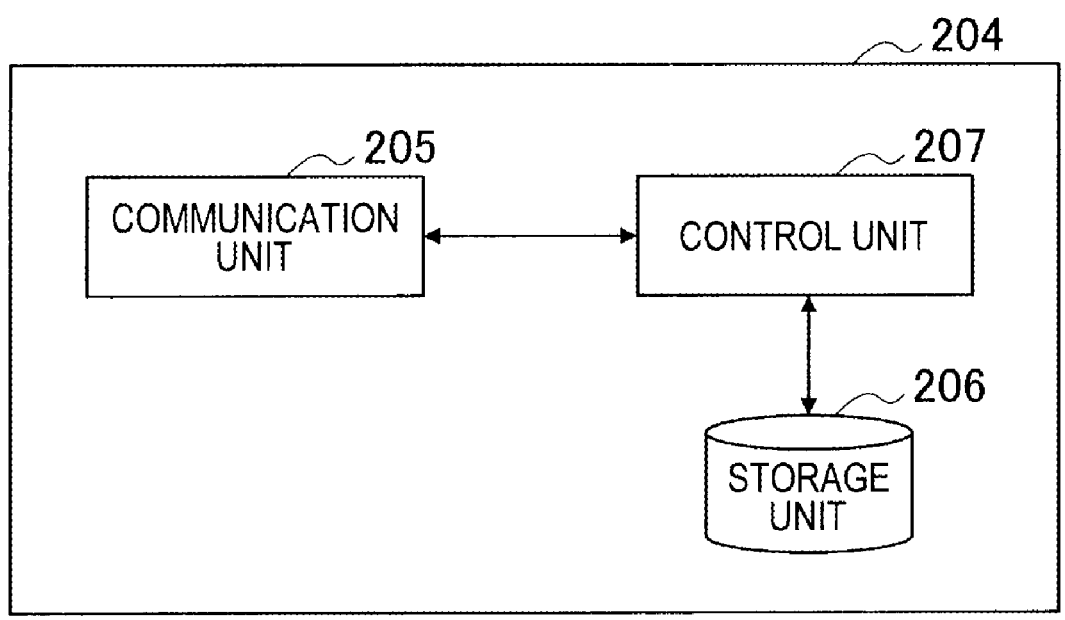
FIG. 15 is a block diagram showing an example of a logical configuration of a secondary usage node (SUE) according to the first embodiment.

FIG. 15 is a block diagram showing an example of a logical configuration of the SUE 204 that is configured based on the above-described concept. Referring to FIG. 15, the SUE 204 includes a communication unit 205, a storage unit 206 and a control unit 207.

The communication unit 205 can receive a beacon for the second communication service from the SSC 200 in accordance with a given communication scheme. Further, the communication unit 205 transmits a connection request or a data signal by using a transmission power within the range that does not cause substantial interference on the primary usage node under control of the control unit 207.

The storage unit 206 stores programs and data to be used for the operation of each unit of the SUE 204 by using a recording medium such as hard disk or semiconductor memory, for example. Further, in this embodiment, the storage unit 206 stores the value of the transmission power, the location data or the like which are included in the beacon that is received by the communication unit 205, for example.

The control unit 207 controls the overall functions of the SUE 204 by using a control device such as a CPU, for example. For example, in this embodiment, the control unit 207 controls the value of the transmission power used for transmission of secondary signals by the communication unit 205 depending on the positional relationship with the base station 100 and the SSC 200 as described above. A specific flow of a transmission power control process by the control unit 207 is described hereinafter with reference to FIG. 16.

(Flow of Transmission Power Control Process)

Figure 16:
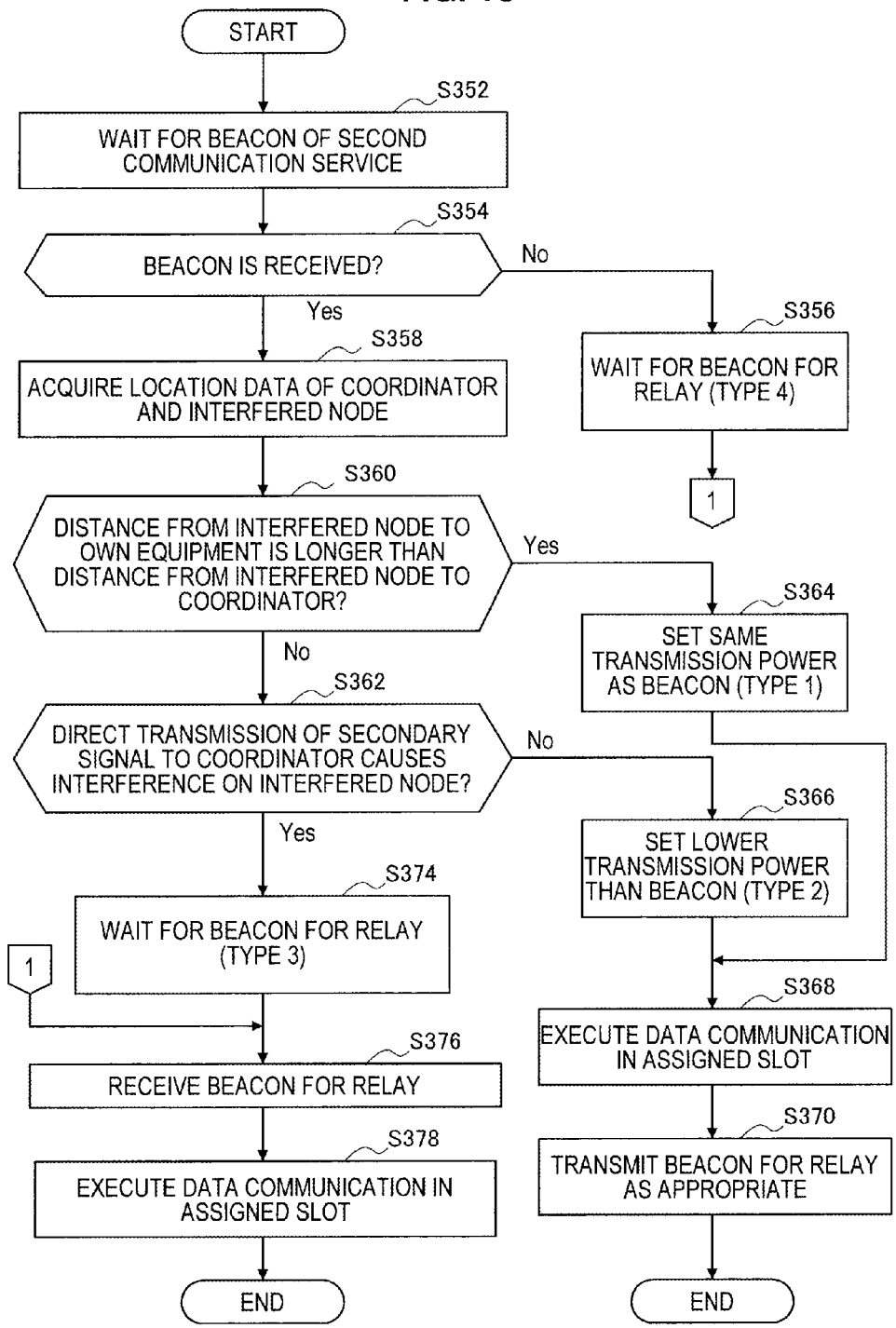
FIG. 16 is a flowchart showing an example of a flow of a transmission power control process of the secondary usage node (SUE) according to the first embodiment.

FIG. 16 is a flowchart showing an example of a flow of a transmission power control process by the SUE 204.

Referring to FIG. 16, upon detection of an instruction for start of secondary usage, for example, the control unit 207 of the SUE 204 waits to receive a beacon of the second communication service by the communication unit 205 (step S352). During waiting, the control unit 207 may perform sensing of a secondary signal through the communication unit 205 and acquire data related to communication conditions of the second communication service (e.g. SINR etc.). Then, when a beacon of the second communication service is not received for a given time period, the process proceeds to the step S356. On the other hand, when a beacon transmitted from the SSC 200, for example, is received by the communication unit 205, the process proceeds to the step S358 (step S354).

In the step S356, because a beacon of the second communication service is not received, the control unit 207 waits to receive a beacon for relay without transmitting a secondary signal, as processing according to the above-described Type 4 (step S356). Note that, although not shown in FIG. 16, when it is determined that a cause that a beacon is not received is collision of secondary signals, the control unit 207 may notify the SSC 200 that collision of secondary signals is occurring instead of waiting for receiving a beacon for relay.

On the other hand, in the step S358, the control unit 207 acquires location data indicating the locations of the SSC 200 and the base station 100 which is included in the beacon received by the communication unit 205 (step S358).

Then, the control unit 207 determines whether the distance from the base station 100 as an interfered node to its own equipment is longer than the distance from the base station 100 to the SSC 200 by using the acquired location data and the location data of its own equipment (step S360). When the distance from the base station 100 to its own equipment is longer, the process proceeds to the step S364. On the other hand, when the distance from the base station 100 to its own equipment is shorter, the process proceeds to the step S362.

In the step S362, the control unit 207 determines whether direct transmission of a secondary signal as a response to the beacon from the communication unit 205 to the SSC 200 causes substantial interference on the base station 100 (step S362). For example, when the distance from the base station 100 to its own equipment is shorter than the distance from its own equipment to the SSC 200, it can be determined that direct transmission of a secondary signal to the SSC 200 causes substantial interference on the base station 100. In this case, the process proceeds to the step S374. On the other hand, when it is determined that a secondary signal can be directly transmitted to the SSC 200 without causing substantial interference on the base station 100 by using a transmission power which is lower than the transmission power of the beacon, the process proceeds to the step S366.

In the step S364, because the distance from the base station 100 to its own equipment is longer than the distance from the base station 100 to the SSC 200, the control unit 207 recognizes that its own equipment is classified as the above-described Type 1. In this case, the control unit 207 sets a transmission power which is equal to the transmission power of the beacon from the SSC 200 to the communication unit 205 (step S364).

Further, in the step S366, because a secondary signal can be directly transmitted to the SSC 200 despite that the distance from the base station 100 to its own equipment is shorter than the distance from the base station 100 to the SSC 200, the control unit 207 recognizes that its own equipment is classified as the above-described Type 2. In this case, the control unit 207 sets a transmission power which is lower than the transmission power of the beacon from the SSC 200 to the communication unit 205 (step S366). The value of the transmission power that is set in this step is a value that enables the secondary signal to be received by the SSC 200 without causing substantial interference on the base station 100.

Then, the control unit 207 transmits a connection request for the second communication service to the SSC 200 as a response to the beacon by using the transmission power which is set in the step S364 or S366. Then, after authentication and scheduling by the SSC 200, the control unit 207 receives scheduling information transmitted from the SSC 200. After that, the SUE 204 can perform data communication by the second communication service in the assigned slot in the data communication period (step S368).

Further, the control unit 207 may transmit a beacon for relay to the nearby equipment in order to operate as an ad-hoc gateway to another SUE 204 (e.g. SUE 204-3 or SUE 204-4) that is located in the nearby vicinity of its own equipment (step S370).

On the other hand, in the step S374, because direct transmission of a secondary signal to the SSC 200 causes substantial interference on the base station 100, the control unit 207 recognizes that its own equipment is classified as the above-described Type 3. In this case, the control unit 207 waits to receive a beacon for relay without transmitting a secondary signal (step S374).

Then, if a beacon for relay is received by the communication unit 205 under the condition of waiting to receive a beacon for relay (i.e. in the case of Type 3 or Type 4), the control unit 207 transmits a connection request to the second communication service as a response to the beacon. A transmission power that is used for transmission of the connection request in this step is set to the value that does not cause substantial interference on the base station 100. The connection request is then relayed to the SSC 200 by another SUE 204 that operates as an ad-hoc gateway. Then, after authentication and scheduling by the SSC 200, the control unit 207 receives scheduling information that is transmitted from the SSC 200 and relayed by another SUE 204. After that, the SUE 204 can perform data communication by the second communication service in the assigned slot in the data communication period (step S378).

[2-5. Summary of First Embodiment]

The first embodiment of the present invention is described above with reference to FIGS. 8 to 16. In this embodiment, the SSC 200 controls the second communication service according to the framework for secondary usage which is described above with reference to FIGS. 4 to 7B. Specifically, on the occasion of secondary usage of a spectrum, the SSC 200 receives a primary signal in the primary sensing period (the first period), and determines a parameter value such as a transmission power, a frequency or the order of modulation to be used for transmission of a secondary signal based on the received primary signal, for example. Then, when a secondary signal is not detected in the secondary sensing period (the second period), the SSC 200 transmits a beacon for the second communication service based on the above-described parameter value in the control frame transmission period (the third period). It is thereby possible to avoid collision between a primary signal and a secondary signal or between secondary signals and effectively suppress interference on the occasion of secondary usage of a spectrum.

Further, according to the above-described interference control model, the transmission power of a beacon transmitted from the SSC 200 is determined so that interference on the interfered node is within the acceptable level based on the quality of radio signals required in the first communication service, the interference or noise level in the first communication service, and the path loss on the communication path about one or more secondary usage nodes. It is thereby possible to eliminate (or at least reduce) the possibility that it becomes difficult to receive a primary signal locally in a certain primary usage node.

Further, according to the embodiment, the SUE 204 receives the beacon transmitted in the control frame transmission period (the third period). Then, depending on the positional relationship recognized based on the location data included in the received beacon, the SUE 204 controls the transmission power of a connection request transmitted in the connection and scheduling period (the fourth period) and a data signal transmitted in the data communication period (the fifth period). The SUE 204 can thereby suppress interference on the primary system with a simple mechanism without using beamforming or the like.

Note that, in this embodiment, an example of control of communication at the start of the second communication service is mainly described. However, the framework for secondary usage and the technique of transmission power control described above are applicable to any point after the start of the second communication service.

Further, the case where secondary usage is made on the uplink channel of the first communication service, i.e. when only the base station of the first communication service is taken into consideration as an interfered node is described in this embodiment. However, the present invention is applicable to the case where a plurality of interfered nodes exist as a matter of course.

<3. Second Embodiment>

In the first embodiment of the present invention, the acceptable transmission power allocated to the second communication service is determined by the primary usage node (management node) which is accessible to the database that stores the location data of the primary usage node. This is a passive technique from the viewpoint of the SSC. On the other hand, the SSC may acquire necessary parameters and determine the acceptable transmission power for the second communication service in an active manner. In this section, a case where the terminal device that makes secondary usage actively determines the acceptable transmission power is described as a second embodiment of the present invention.

[3-1. Overview of Communication System]

Figure 17:
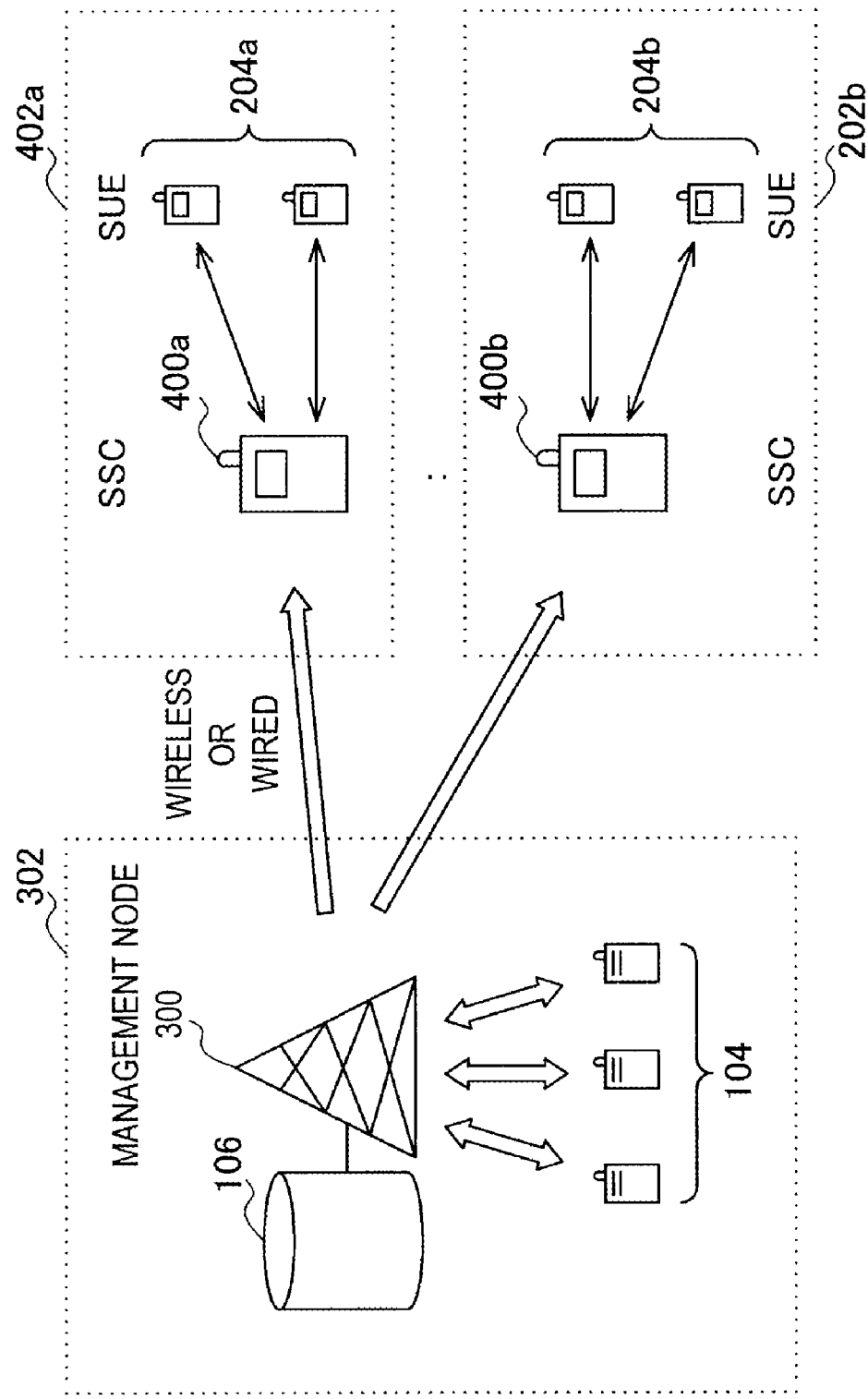
FIG. 17 is an explanatory view to describe an overview of a communication system according to a second embodiment.

FIG. 17 is an explanatory view to describe an overview of a communication system according to the second embodiment of the present invention.

FIG. 17 shows a primary system 302 that operates a first communication service and secondary systems 402a and 402b that respectively operate second communication services. The primary system 302 includes a management node 300 and a plurality of primary usage nodes 104.

The management node 300 is a primary usage node that has a role to manage secondary usage of the spectrum assigned to the first communication service. Although the management node 300 is a base station in the example of FIG. 17, the management node 300 is not limited thereto. In this embodiment, the management node 300 can gain access to a database 106 that stores location data indicating the locations of primary usage nodes that are included in the primary system 302.

On the other hand, the secondary system 402a includes a SSC 400a and a plurality of SUEs 204a. Likewise, the secondary system 402b includes a SSC 400b and a plurality of SUEs 204b.

The SSCs 400 (400a and 400b) are secondary usage nodes that have a role of a coordinator that controls the second communication service described above. Specifically, the SSCs 400 determine the availability of secondary usage according to a predetermined spectrum policy, determine the acceptable transmission power by acquiring necessary parameters from the management node 300, and then transmit a beacon for the second communication service to the SUEs 204 in the nearby vicinity. The SSCs 400 may operate as an engine for cognitive radio (CE), for example.

[3-2. Exemplary Configuration of Management Node]

Figure 18:
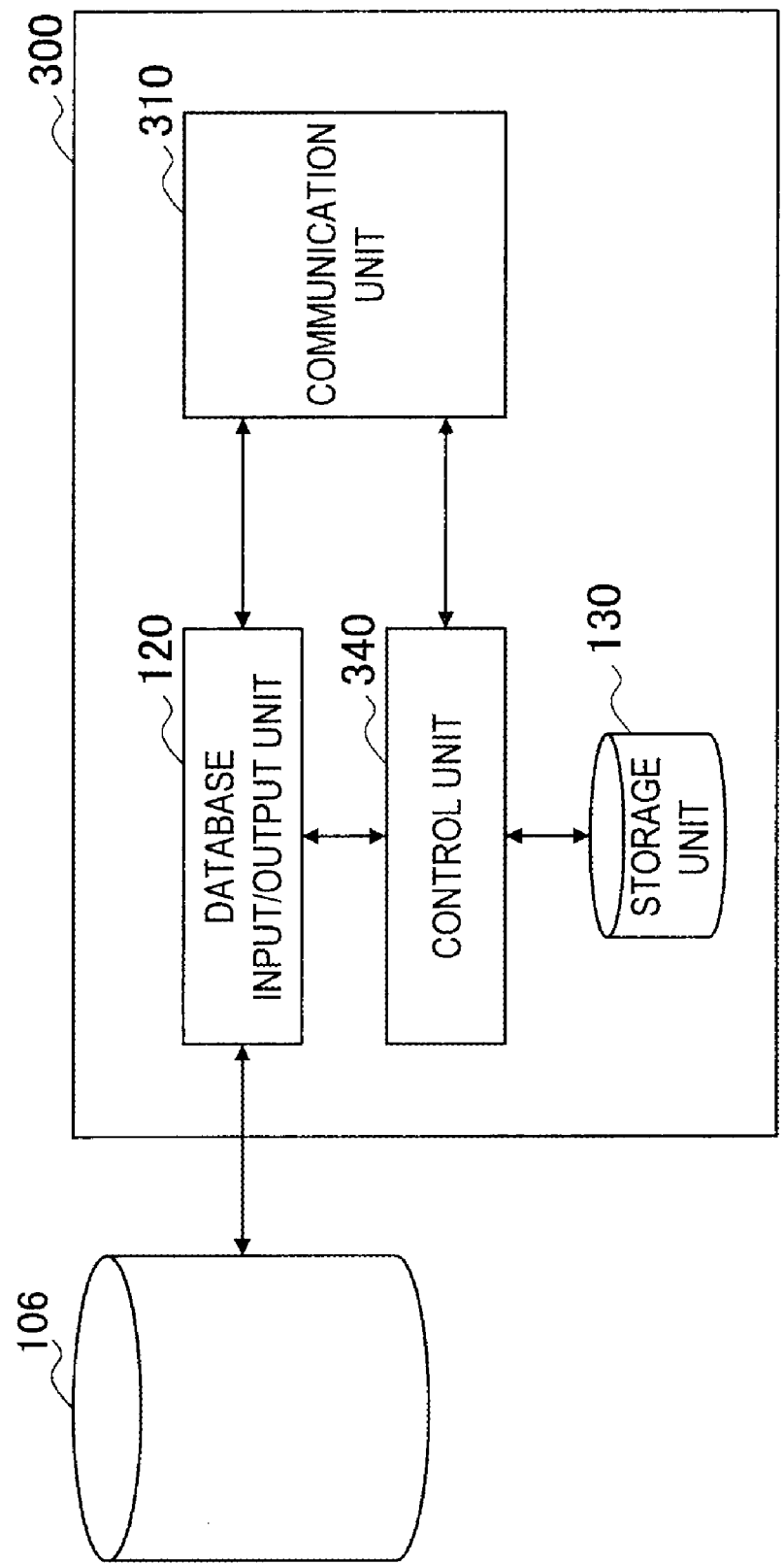
FIG. 18 is a block diagram showing an example of a logical configuration of a management node according to the second embodiment.

FIG. 18 is a block diagram showing an example of a logical configuration of the management node 300 shown in FIG. 17. Referring to FIG. 18, the management node 300 includes a communication unit 310, a database input/output unit 120, a storage unit 130 and a control unit 340.

The communication unit 310 transmits and receives radio signals to and from the primary usage nodes 104 by using a communication interface that can include an antenna, an RF circuit, a baseband circuit or the like in accordance with a given communication scheme of the first communication service. Further, the communication unit 310 transmits the location data of the primary usage nodes 104 stored in the database 106 and parameters to be used for determination of a transmission power stored in the database 106 or the storage unit 130 to the SSC 400.

The control unit 340 controls the overall functions of the management node 300 by using a control device such as a CPU, for example. Further, in this embodiment, the control unit 340 transmits the above-described location data and parameters to be used when the SSC 400 determines the acceptable transmission power according to the above-described interference control model to the SSC 400 through the communication unit 310 (or another backhaul link). The location data and parameters may be transmitted on a regular basis by using a predetermined channel such as CPC, for example.

Alternatively, the location data and parameters may be transmitted in response to a transmission request from the SSC 400, for example.

[3-3. Exemplary Configuration of Secondary Usage Node (SSC)]

(Description of Functional Blocks)

Figure 19:
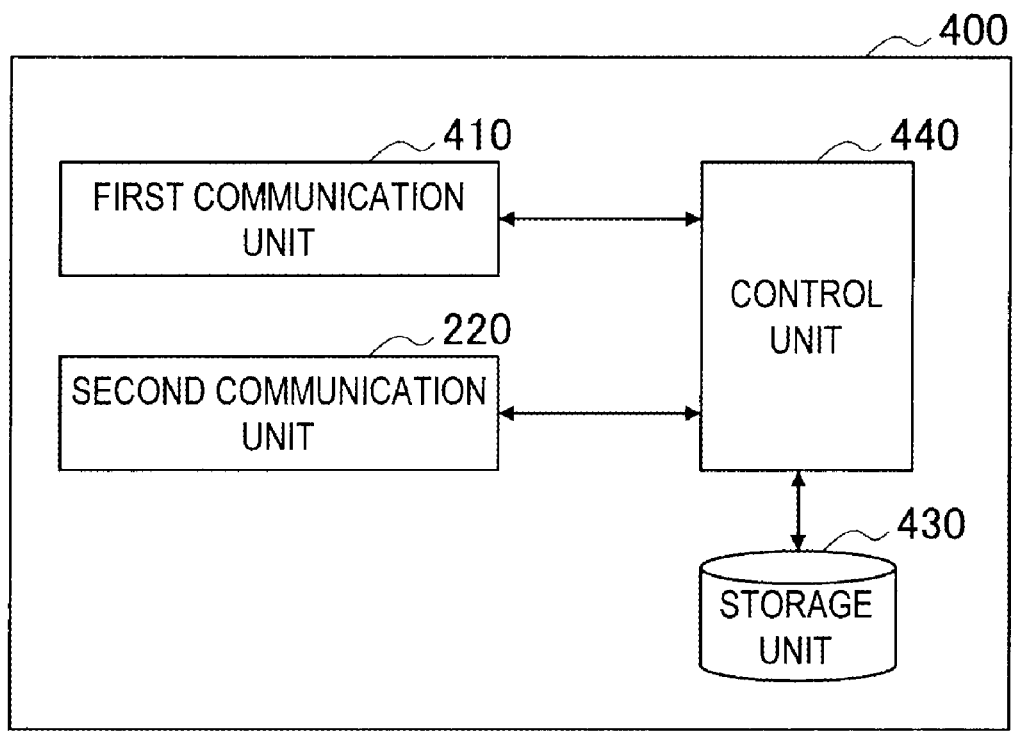
FIG. 19 is a block diagram showing an example of a logical configuration of a secondary usage node (SSC) according to the second embodiment.

FIG. 19 is a block diagram showing an example of a logical configuration of the SSC 400 shown in FIG. 17. Referring to FIG. 19, the SSC 400 includes a first communication unit 410, a second communication unit 220, a storage unit 430 and a control unit 440.

The first communication unit 410 receives radio signals containing the data and parameters transmitted from the management node 300 in accordance with a given communication scheme. A channel used for communication between the first communication unit 410 and the management node 300 may be the above-described CPC, which is a control channel, for example.

Specifically, the first communication unit 410 attempts to receive the data and parameters to be used for determination of a transmission power from the management node 300 in response to an instruction for start of secondary usage of a spectrum or the like, for example. The data and parameters to be used for determination of a transmission power include the location data of an interfered node, the quality of radio signals required in the first communication service, the interference or noise level in the first communication service or the like, for example. Further, the data to be used for determination of a transmission power may include location data indicating the locations of other secondary usage nodes. If the first communication unit 410 receives the data and parameters from the management node 300, it outputs the received data and parameters to the control unit 440. If, on the other hand, the first communication unit 410 fails to receive the necessary data and parameters for some reasons such as unsuitable signal reception environment, it provides notification to the control unit 440.

The storage unit 430 stores programs and data to be used for the operation of each unit of the SSC 400 by using a recording medium such as hard disk or semiconductor memory, for example. Further, in this embodiment, the storage unit 430 stores various parameters for determination of the acceptable transmission power for the second communication service and control of the transmission power. The parameters stored in the storage unit 430 may include the location data of its own equipment (and other secondary usage nodes that subscribe to the second communication service according to need), the parameters received from the management node 300 through the first communication unit 410 or the like, for example.

The control unit 440 controls the overall functions of the SSC 400 by using a control device such as a CPU, for example. For example, in this embodiment, when making secondary usage of the spectrum assigned to the first communication service, the control unit 440 determines the acceptable transmission power for the second communication service according to the above-described interference control model. If the control unit 440 fails to receive radio signals from the management node 300 and is thus unable to acquire the latest location data of the primary usage node and necessary parameters, it determines the acceptable transmission power by counting in the margin for reducing the possibility that causes interference on the primary usage node. Then, the control unit 440 controls the value of the transmission power to be used for transmission of beacons for the second communication service and other secondary signals by the second communication unit 220 to fall within the range of the determined acceptable transmission power.

(Flow of Secondary Usage Start Process)

FIG. 20 is a flowchart showing an example of a flow of a secondary usage start process by the SSC 400.

Referring to FIG. 20, the control unit 440 first determines whether radio signals (primary signals) are receivable from the management node 300 through the first communication unit 410 (step S502). If radio signals from the management node 300 are receivable, the process proceeds to the step S504. If, on the other hand, radio signals from the management node 300 are not receivable, the process proceeds to the step S508.

In the step S504, the control unit 440 acquires the location data of the primary usage node serving as an interfered node that is received from the management node 300 through the first communication unit 410. Further, the control unit 440 acquires the parameters received from management node 300 in the same manner (step S504). Note that, in the case where secondary usage is made on the uplink channel of the OFDMA system as in the example shown in FIG. 2A, the interfered node is the base station only. In such a case, the control unit 440 acquires only the location data of the management node 300, which is the base station, as the location data of the primary usage node. Further, the necessary parameters in the step S504 correspond to the quality of radio signals required in the first communication service, the interference or noise level in the first communication service (or a parameter for calculating those levels) or the like, for example.

Then, the control unit 440 determines the transmission power depending on the acceptable interference power of the second communication service based on the location data and parameters received in the step S504 (step S506). Specifically, the control unit 440 can determine the transmission power depending on the acceptable interference power of the second communication service according to the expression (9) in the above-described interference control model, for example. For example, the quality of radio signals required in the first communication service corresponds to the term $P_{rx\_primary,primary}/SINR_{required}$ in the expression (9). Further, the interference or noise level corresponds to the term $N_{Primary}$ in the expression (9). Further, the value of the path loss $L_{path\_tx\_secondary,i}$ in the expression (9) can be calculated according to the expression (6) by using the distance d that is derived from the location data of the primary usage node and the location data of the SSC 400. Note that the control unit 440 may calculate the value of the path loss $L_{path\_tx\_secondary,i}$ as a difference between the transmission power value of a downlink signal from the base station and the reception level of the downlink signal instead of calculating it from the location data. Further, when another second communication service exists, the control unit 440 may distribute the transmission power according to the expression (10) of the equal type or the expression (11) of the unequal type.

On the other hand, if radio signals from the management node 300 are not receivable, in the step S508, the control unit 440 acquires the location data and parameters for determining a transmission power from the storage unit 430 (step S508). For example, the control unit 440 may receive the location data of the interfered node and necessary parameters through the first communication unit 410 when communication with the management node 300 becomes available and store them into the storage unit 430 for later use. Further, when the types of the first communication service which is the target of secondary usage are limited to several candidates in advance, for example, a parameter indicating the quality of radio signals required in the first communication service may be stored as a default value in the storage unit 430.

Then, the control unit 440 determines the transmission power depending on the acceptable interference power of the second communication service based on the location data and parameters acquired in the step S508 (step S510). In this case, however, there is a possibility that the parameters used for determination of the transmission power are not the latest. Thus, the control unit 440 adds a given margin to the value of the transmission power so as to reduce the possibility that causes interference on the primary usage node. Specifically, the control unit 440 can determine the transmission power according to the expression (12) of the interfering margin reduction type described above, for example. The value of $N_{estimation}$ in the expression (12) is determined to be inclusive of an extra number according to the number of SUEs 204 that possibly subscribe to the second communication service, for example.

Then, when primary signals from the management node 300 are receivable, the control unit 440 performs sensing of a primary signal and achieves synchronization of the uplink channel of the first communication service (step S516). When, on the other hand, radio signals from the management node 300 are not receivable, the step S516 can be skipped. The control unit 440 then performs sensing of a secondary signal in the secondary sensing period and checks whether a secondary signal is transmitted from a communication device in the nearby vicinity (step S518). When a secondary signal from a nearby communication device is detected, the process proceeds to the step S526. On the other hand, when a secondary signal from a nearby communication device is not detected, the process proceeds to the step S522 (step S520).

In the step S522, the control unit 440 controls the second communication unit 220 to transmit a beacon for the second communication service in the control frame transmission period by using the transmission power determined in the step S506 or the step S510 (step S522). The beacon includes the value of the acceptable transmission power allocated to the second communication service and the location data of the interfered node and the SSC 400.

Then, when the control unit 440 receives a connection request to the second communication service from the SUE 204 through the second communication unit 220, the control unit 440 authenticates the connection request and performs scheduling of the SUE 204 in the connection and scheduling period (step S524). The SUE 204 can thereby perform data communication by the second communication service in the data communication period. At this time, the SUE 204 controls the transmission power of a connection request and a data signal based on the value of the acceptable transmission power and each location data included in the beacon that has been transmitted from the SSC 400 in the step S522.

On the other hand, in the step S526, the control unit 440 waits for a given time in order to avoid collision of a secondary signal transmitted from another communication device and a beacon transmitted from itself (step S526). After that, the process returns to the step S516 (or to the step S518 when a primary signal from the management node 300 is not receivable).

By the above secondary usage start process, the SSC 400 can suppress the transmission power of a beacon transmitted from itself and a secondary signal transmitted from a SUE to the range that does not cause substantial interference on the primary system and avoid collision of secondary signals.

[3-4. Summary of Second Embodiment]

The second embodiment of the present invention described above with reference to FIGS. 17 to 20. In this embodiment, the acceptable transmission power for the second communication service that makes secondary usage of the spectrum assigned to the first communication service is determined by the SSC 400 which acts as the coordinator of the second communication service according to the above-described interference control model. The SSC 400 can thereby determine the transmission power to be used for the second communication service in an active manner and avoid collision between a primary signal and a secondary signal or between secondary signals and effectively suppress interference.

Further, if the SSC 400 fails to receive radio signals from the management node 300 and is thus unable to acquire the latest location data of the primary usage node, the acceptable transmission power is determined by counting in the margin for reducing the possibility that causes interference on the primary usage node. The SSC 400 can thereby start secondary usage of a spectrum autonomously and safely even when the SSC 400 is located in the area where signal receiving conditions are relatively unsuitable due to shadowing (shielding), fading or the like.

<4. Application to TV Band>

FIG. 21 is an explanatory view to describe an application of the above-mentioned first or second embodiment to TV band. In the example of FIG. 21, a primary usage node 900 is a broadcast station of TV broadcast (TV broadcaster). Primary usage nodes 910a to 910c are receiving station of TV broadcast. The primary usage node 900 provides a digital TV broadcast service on a frequency band F1 to the primary usage nodes 910a to 910c located inside the border 902 or 904. The inside area of the border 902 is a service area of the digital TV broadcast service. The shaded area between the border 902 and border 904 is a guard area where secondary usage of spectrum is restricted. Meanwhile, the area between the border 904 and border 906 is a TV white space. Secondary usage nodes 920a to 920c are located in this TV white space and operate second communication services on a frequency channel F3 which is different from the frequency band F1, for example. However, even if a guard band is set between the frequency band F1 for the first communication service and the frequency band F3 for the second communication service, there is a risk that a fatal interference occurs not only on the secondary system but also on the primary system at position P0, for example. Such a risk might be reduced by expanding the width of the guard area. However, expanding the width of the guard area leads to a decrease of an opportunity of secondary usage of spectrum. From this point of view, to control a transmission poser of a second communication service according to the above-mentioned first or second embodiment allows for reducing interference on the primary system to fall within an acceptable range without excessively expanding the width of the guard area.

It should be noted that a series of processing according to the first and second embodiments described in this specification may be implemented on either hardware or software. In the case of executing a series or part of processing on software, a program constituting the software is prestored in a recording medium such as ROM (Read Only Memory), read into RAM (Random Access Memory) and then executed by using a CPU or the like.

The subject matter of each embodiment described in this specification is applicable to various types of modes of secondary usage. For example, as described above, it can be said that operation of relay node or femto-cell to cover a spectrum hole of the first communication service is a mode of secondary usage of spectrum. Further, the relationship between any one or more of macro-cell, RRH (Remote Radio Head), Hotzone, relay node, femto-cell and the like may form a mode of secondary usage of spectrum (such as heterogeneous network).

Although preferred embodiments of the present invention are described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-187372 filed in the Japan Patent Office on Aug. 12, 2009 and Japanese Priority Patent Application JP 2010-110015 filed in the Japan Patent Office on May 12, 2010, the entire contents of which are hereby incorporated by reference.

What is claimed is:

1. A method of controlling communication of a second communication service making secondary usage of a spectrum assigned to a first communication service, with use of a communication device, comprising the steps of:
   receiving a radio signal transmitted for the first communication service in a first period on a time axis;
   determining a parameter value to be used for controlling communication of the second communication service based at least in part on the radio signal received in the first period;
   sensing for a radio signal transmitted for the second communication service during a second period subsequent to the first period; and
   transmitting a beacon for the second communication service based at least in part on the parameter value in a third period subsequent to the second period when a radio signal for the second communication service is not detected in the second period.

2. The method according to claim 1, wherein
the step of determining the parameter value includes determining a transmission power of the beacon transmitted in the third period based at least in part on the radio signal received in the first period.

3. The method according to claim 1, further comprising the step of:
   receiving a connection request to the second communication service, from a secondary usage node having received the beacon, in a fourth period subsequent to the third period.

4. The method according to claim 3, wherein:
   a transmission power of the connection request transmitted from the secondary usage node in the fourth period is determined based at least in part on data included in the beacon transmitted from the communication device in the third period.

5. The method according to claim 3, further comprising the step of:
   assigning a slot of a fifth period subsequent to the fourth period to each secondary usage node that is a transmission source of one or more connection requests received in the fourth period for data transmission by the secondary usage node.

6. The method according to claim 5, wherein:
   the beacon includes data indicating a beacon interval, and the first period, the second period, the third period, the fourth period and the fifth period are repeated at an interval corresponding to the beacon interval.

7. The method according to claim 6, further comprising the step of:
   changing the beacon interval when a data rate required for the second communication service is changed.

8. The method according to claim 6, wherein:
   the fifth period is followed by a guard interval.

9. The method according to claim 3, further comprising the step of:
   receiving a notification indicating occurrence of collision of a beacon from a secondary usage node in the fourth period when collision of the beacon transmitted in the third period and another radio signal is detected by the secondary usage node.

10. The method according to claim 3, further comprising the step of:
    receiving data related to communication conditions of the first communication service or the second communication service sensed in a secondary usage node from the secondary usage node in the fourth period.

11. The method according to claim 1, further comprising the step of:
    receiving a reference signal for synchronizing periods among a plurality of communication devices from an external node of the communication device in the first period.

12. A communication device comprising:
    a communication unit to transmit and receive radio signals for a second communication service making secondary usage of a spectrum assigned to a first communication service; and
    a control unit to control communication by the communication unit, wherein the control unit:
       controls the communication unit to receive a radio signal transmitted for the first communication service in a first period on a time axis,
       determines a parameter value to be used for controlling communication of the second communication service based at least in part on the radio signal received in the first period,
       senses for a radio signal transmitted for the second communication service through the communication unit during a second period subsequent to the first period, and
       controls the communication unit to transmit a beacon for the second communication service based at least in part on the parameter value in a third period subsequent to the second period when a radio signal for the second communication service is not detected in the second period.

13. At least one storage storing executable instructions that, when executed by a computer that controls a communication device including a communication unit that is able to transmit and receive a radio signal for a second communication service making secondary usage of a spectrum assigned to a first communication service cause the computer to function as:
    a control unit to control communication by the communication unit, the control unit executing a process including:
       controlling the communication unit to receive a radio signal transmitted for the first communication service in a first period on a time axis;
       determining a parameter value to be used for controlling communication of the second communication service based at least in part on the radio signal received in the first period;

sensing for a radio signal transmitted for the second communication service through the communication unit during a second period subsequent to the first period; and
controlling the communication unit to transmit a beacon for the second communication service based at least in part on the parameter value in a third period subsequent to the second period when a radio signal for the second communication service is not detected in the second period.

* * * * *